United States Patent
Bridgelall et al.

(10) Patent No.: US 8,638,194 B2
(45) Date of Patent: Jan. 28, 2014

(54) MULTIPLE RADIO FREQUENCY IDENTIFICATION (RFID) TAG WIRELESS WIDE AREA NETWORK (WWAN) PROTOCOL

(75) Inventors: Rajinder Bridgelall, Plano, TX (US); Allan R. Griebenow, Plano, TX (US)

(73) Assignee: Axcess International, Inc., Addison, TX (US)

( * ) Notice: Subject to any disclaimer, the term of this patent is extended or adjusted under 35 U.S.C. 154(b) by 1427 days.

(21) Appl. No.: 12/180,181

(22) Filed: Jul. 25, 2008

(65) Prior Publication Data

US 2010/0019887 A1 Jan. 28, 2010

(51) Int. Cl.
*H04Q 5/22* (2006.01)
*G08B 13/14* (2006.01)
*G05B 11/01* (2006.01)
*H04M 1/00* (2006.01)
*H04M 1/66* (2006.01)
*H04B 1/40* (2006.01)
*H04W 72/00* (2009.01)
*H04W 4/00* (2009.01)
*G06F 15/167* (2006.01)

(52) U.S. Cl.
USPC ... 340/10.2; 340/10.1; 340/572.1; 340/12.51; 455/519; 455/411; 455/86; 455/450; 455/422.1; 709/212; 379/157

(58) Field of Classification Search
USPC ......... 340/10.1, 825.54, 825.69, 825.71, 505, 340/568, 572, 572.1, 572.3, 572.4, 10.3, 340/10.41, 10.51, 3.43, 3.44; 455/41.1, 455/41.2, 73, 86, 456.5, 414.1; 370/329, 370/401, 342, 331; 379/157; 709/212
See application file for complete search history.

(56) References Cited

U.S. PATENT DOCUMENTS 3,811,008 A 5/1974 Lee
3,868,640 A 2/1975 Binnie et al.
(Continued)

FOREIGN PATENT DOCUMENTS

BE 1006392 9/1994
DE 298 15 797 U1 10/1998
(Continued)

OTHER PUBLICATIONS

PCT Notification of Transmittal of the International Search Report and the Written Opinion of the International Searching Authority, or the Declaration, mailed Sep. 22, 2008, in re PCT/US 06/049191 filed Dec. 22, 2006 (8 pages).

(Continued)

*Primary Examiner* — Jennifer Mehmood
*Assistant Examiner* — Mirza Alam
(74) *Attorney, Agent, or Firm* — Fay Kaplun & Marcin, LLP

(57) ABSTRACT

In certain embodiments, an RFID tag comprises a memory module and one or more processing units. The memory module stores a subscriber identification number shared by the tag and one or more other tags for accessing a WWAN. Each tag is operable to access the WWAN using the subscriber identification number at a corresponding unique timeslot, the corresponding unique timeslot for a tag being distinct from the timeslots at which the other tags can access the WWAN using the subscriber identification number. The one or more processing units access the WWAN using the subscriber identification number to initiate a tag session at the corresponding unique timeslot for the tag. The corresponding unique timeslot for the tag is distinct from timeslots at which the other tags may access the WWAN using the subscriber identification number. The one or more processing units are operable to communicate tag information during the tag session at the corresponding unique timeslot for the tag.

33 Claims, 14 Drawing Sheets

(56) References Cited

U.S. PATENT DOCUMENTS

| | | |
|---|---|---|
| 4,217,588 A | 8/1980 | Freeny, Jr. |
| 4,281,354 A | 7/1981 | Conte |
| 4,303,910 A | 12/1981 | McCann |
| 4,385,231 A | 5/1983 | Mizutani et al. |
| 4,449,189 A | 5/1984 | Feix et al. |
| 4,458,266 A | 7/1984 | Mahoney |
| 4,459,474 A | 7/1984 | Walton |
| 4,471,345 A | 9/1984 | Barrett, Jr. |
| 4,528,663 A | 7/1985 | Citta |
| 4,598,275 A | 7/1986 | Ross et al. |
| 4,654,793 A | 3/1987 | Elrod |
| 4,656,463 A | 4/1987 | Anders et al. |
| 4,672,374 A | 6/1987 | Desjardins |
| 4,675,656 A | 6/1987 | Narcisee |
| 4,691,202 A | 9/1987 | Denne et al. |
| 4,774,570 A | 9/1988 | Araki |
| 4,777,526 A | 10/1988 | Saitoh et al. |
| 4,822,990 A | 4/1989 | Tamada et al. |
| 4,831,438 A | 5/1989 | Bellman, Jr. et al. |
| 4,833,807 A | 5/1989 | McLean |
| 4,862,160 A | 8/1989 | Ekchian et al. |
| 4,864,292 A | 9/1989 | Nieuwkoop |
| 4,951,147 A | 8/1990 | Aknar et al. |
| 4,955,038 A | 9/1990 | Lee et al. |
| 5,006,983 A | 4/1991 | Wayne et al. |
| 5,030,807 A | 7/1991 | Landt et al. |
| 5,051,741 A | 9/1991 | Wesby |
| 5,086,480 A | 2/1992 | Sexton |
| 5,109,278 A | 4/1992 | Erickson et al. |
| 5,111,291 A | 5/1992 | Erickson et al. |
| 5,153,878 A | 10/1992 | Krebs |
| 5,175,729 A | 12/1992 | Borras et al. |
| 5,202,759 A | 4/1993 | Laylock |
| 5,206,639 A | 4/1993 | Kamens |
| 5,220,557 A | 6/1993 | Kelley |
| 5,227,803 A | 7/1993 | O'Connor et al. |
| 5,229,850 A | 7/1993 | Toyoshima |
| 5,237,408 A | 8/1993 | Blum et al. |
| 5,266,925 A | 11/1993 | Vercellotti et al. |
| 5,272,476 A | 12/1993 | McArthur et al. |
| 5,287,269 A | 2/1994 | Dorrough et al. |
| 5,289,369 A | 2/1994 | Hirshberg |
| 5,305,008 A | 4/1994 | Turner |
| 5,321,396 A | 6/1994 | Lamming et al. |
| 5,351,052 A | 9/1994 | D'Hont et al. |
| 5,371,899 A | 12/1994 | Kuznicki et al. |
| 5,408,330 A | 4/1995 | Squicciarini et al. |
| 5,416,468 A | 5/1995 | Baumann |
| 5,423,574 A | 6/1995 | Forte-Pathroff |
| 5,425,032 A | 6/1995 | Shloss et al. |
| 5,432,864 A | 7/1995 | Lu et al. |
| 5,448,242 A | 9/1995 | Sharpe et al. |
| 5,450,087 A | 9/1995 | Hurta et al. |
| 5,450,492 A | 9/1995 | Hook et al. |
| 5,453,747 A | 9/1995 | D'Hont et al. |
| 5,455,575 A | 10/1995 | Schuermann |
| 5,471,212 A | 11/1995 | Sharpe et al. |
| 5,488,376 A | 1/1996 | Hurta et al. |
| 5,491,471 A | 2/1996 | Stobbe |
| 5,502,806 A | 3/1996 | Mahoney et al. |
| 5,519,381 A | 5/1996 | Marsh et al. |
| 5,523,737 A | 6/1996 | Luna |
| 5,525,992 A | 6/1996 | Froschermeier |
| 5,525,994 A | 6/1996 | Hurta et al. |
| 5,526,133 A | 6/1996 | Paff |
| 5,528,232 A | 6/1996 | Verma et al. |
| 5,539,394 A | 7/1996 | Cato et al. |
| 5,541,928 A | 7/1996 | Kobayashi et al. |
| 5,565,858 A | 10/1996 | Guthrie |
| 5,566,327 A | 10/1996 | Sehr |
| 5,576,838 A | 11/1996 | Renie |
| 5,581,297 A | 12/1996 | Koz et al. |
| 5,589,873 A | 12/1996 | Natori et al. |
| 5,621,412 A | 4/1997 | Sharpe et al. |
| 5,629,981 A | 5/1997 | Nerlikar |
| 5,633,875 A | 5/1997 | Hershey et al. |
| 5,640,151 A | 6/1997 | Reis |
| 5,668,803 A | 9/1997 | Tymes et al. |
| 5,684,828 A | 11/1997 | Bolan et al. |
| 5,686,902 A | 11/1997 | Reis et al. |
| 5,689,442 A | 11/1997 | Swanson et al. |
| 5,694,162 A | 12/1997 | Freeny, Jr. |
| 5,694,514 A | 12/1997 | Evans et al. |
| 5,721,733 A | 2/1998 | Wang et al. |
| 5,729,695 A | 3/1998 | Ahlm et al. |
| 5,737,330 A | 4/1998 | Fulthorp et al. |
| 5,742,237 A | 4/1998 | Bledsoe |
| 5,745,037 A | 4/1998 | Guthrie et al. |
| 5,748,908 A | 5/1998 | Yu |
| 5,754,541 A | 5/1998 | Glisic et al. |
| 5,774,459 A | 6/1998 | Charrat |
| 5,797,126 A | 8/1998 | Helbling et al. |
| 5,804,810 A | 9/1998 | Wolley et al. |
| 5,805,082 A | 9/1998 | Hassett |
| 5,808,587 A | 9/1998 | Shima |
| 5,811,772 A | 9/1998 | Lucero |
| 5,813,912 A | 9/1998 | Shultz |
| 5,818,915 A | 10/1998 | Hayes et al. |
| 5,822,714 A | 10/1998 | Cato |
| 5,837,982 A | 11/1998 | Fujoka |
| 5,839,058 A | 11/1998 | Phillips et al. |
| 5,841,365 A | 11/1998 | Rimkus |
| 5,842,131 A | 11/1998 | Yamane |
| D403,392 S | 12/1998 | Briggs et al. |
| 5,848,395 A | 12/1998 | Edgar et al. |
| 5,856,931 A | 1/1999 | McCasland |
| 5,857,152 A | 1/1999 | Everett |
| 5,866,890 A | 2/1999 | Neuner |
| 5,867,823 A | 2/1999 | Richardson |
| 5,870,029 A | 2/1999 | Otto et al. |
| 5,870,459 A | 2/1999 | Phillips et al. |
| 5,872,887 A | 2/1999 | Walker |
| 5,874,902 A | 2/1999 | Heinrich et al. |
| D406,871 S | 3/1999 | Briggs |
| D407,133 S | 3/1999 | Briggs |
| 5,880,453 A | 3/1999 | Wang et al. |
| 5,886,634 A | 3/1999 | Muhme |
| 5,892,454 A | 4/1999 | Schipper et al. |
| 5,894,589 A | 4/1999 | Reber et al. |
| 5,903,321 A | 5/1999 | Tung et al. |
| 5,918,211 A | 6/1999 | Sloane |
| 5,929,778 A | 7/1999 | Asama et al. |
| 5,932,869 A | 8/1999 | Gottlich et al. |
| 5,936,583 A | 8/1999 | Sekine et al. ............... 343/702 |
| 5,940,006 A | 8/1999 | MacLellan et al. |
| 5,942,987 A | 8/1999 | Heinrich et al. |
| 5,946,444 A | 8/1999 | Evans et al. |
| 5,946,613 A | 8/1999 | Hayes, Jr. et al. |
| 5,956,259 A | 9/1999 | Hartsell, Jr. et al. |
| 5,959,277 A | 9/1999 | Lucero |
| 5,966,068 A | 10/1999 | Wicks et al. |
| 5,966,654 A | 10/1999 | Croughwell et al. |
| 5,973,613 A | 10/1999 | Reis et al. |
| 5,978,770 A | 11/1999 | Waytena et al. |
| 5,978,821 A | 11/1999 | Freeny |
| 5,987,421 A | 11/1999 | Chuang |
| 6,003,013 A | 12/1999 | Boushy et al. |
| 6,028,626 A | 2/2000 | Aviv |
| 6,034,603 A | 3/2000 | Steeves |
| 6,061,344 A | 5/2000 | Wood, Jr. |
| 6,127,928 A | 10/2000 | Issacman et al. |
| 6,130,623 A | 10/2000 | MacLellan et al. |
| 6,154,137 A | 11/2000 | Goff et al. ............... 340/572.4 |
| 6,232,877 B1 | 5/2001 | Ashwin |
| 6,271,752 B1 | 8/2001 | Vaios |
| 6,275,476 B1 | 8/2001 | Wood, Jr. |
| 6,294,953 B1 | 9/2001 | Steeves |
| 6,385,772 B1 | 5/2002 | Courtney |
| 6,433,683 B1 | 8/2002 | Robinson |
| 6,456,321 B1 | 9/2002 | Ito et al. |
| 6,460,069 B1 | 10/2002 | Berlin et al. |
| 6,462,660 B1 | 10/2002 | Cannon et al. |
| 6,570,487 B1 | 5/2003 | Steeves |
| 6,570,498 B1 | 5/2003 | Frost et al. |

(56) References Cited

U.S. PATENT DOCUMENTS

| | | | |
|---|---|---|---|
| 6,686,829 | B1 | 2/2004 | Hohberger et al. |
| 7,005,985 | B1 | 2/2006 | Steeves |
| 7,271,727 | B2 | 9/2007 | Steeves |
| 7,286,158 | B1 | 10/2007 | Griebenow |
| 7,551,927 | B2* | 6/2009 | McKenna et al. ............. 455/450 |
| 2001/0048361 | A1 | 12/2001 | Mays et al. ................ 340/10.51 |
| 2003/0139148 | A1* | 7/2003 | Damgaard et al. ............. 455/86 |
| 2003/0220711 | A1 | 11/2003 | Allen |
| 2004/0217865 | A1 | 11/2004 | Turner ....................... 340/572.7 |
| 2004/0233040 | A1 | 11/2004 | Lane et al. .................. 340/5.86 |
| 2005/0035860 | A1* | 2/2005 | Taylor et al. .............. 340/572.1 |
| 2005/0088286 | A1 | 4/2005 | Heinrich et al. |
| 2005/0113066 | A1* | 5/2005 | Hamberg ...................... 455/411 |
| 2006/0013070 | A1* | 1/2006 | Holm et al. .................... 367/128 |
| 2006/0040692 | A1* | 2/2006 | Anttila et al. ................. 455/519 |
| 2006/0066444 | A1 | 3/2006 | Steeves |
| 2006/0071756 | A1* | 4/2006 | Steeves ........................ 340/10.1 |
| 2006/0078101 | A1* | 4/2006 | Light et al. .................... 379/157 |
| 2006/0140374 | A1 | 6/2006 | Light et al. |
| 2007/0075838 | A1* | 4/2007 | Powell ......................... 340/10.2 |
| 2007/0159338 | A1 | 7/2007 | Beber |
| 2007/0205896 | A1 | 9/2007 | Beber |
| 2007/0285241 | A1 | 12/2007 | Griebenow |
| 2008/0005259 | A1* | 1/2008 | Inano et al. ................... 709/212 |
| 2008/0042850 | A1 | 2/2008 | DeWitte |
| 2008/0309490 | A1* | 12/2008 | Honkanen et al. ......... 340/572.1 |
| 2009/0146832 | A1* | 6/2009 | Ebert et al. ............... 340/825.49 |

FOREIGN PATENT DOCUMENTS

| | | |
|---|---|---|
| EP | 0 161 779 | 11/1985 |
| EP | 0 221 631 | 5/1987 |
| EP | 0 245 555 | 11/1987 |
| EP | 0 467 036 | 1/1992 |
| EP | 0 565 046 | 10/1993 |
| EP | 0 781 049 | 6/1997 |
| GB | 2 187 317 | 9/1987 |
| GB | 2 250 156 | 5/1992 |
| GB | 2 295 065 | 5/1996 |
| GB | 2 307 324 | 5/1997 |
| WO | WO 88/04082 | 6/1988 |
| WO | WO 90/01838 | 2/1990 |
| WO | WO 91/17515 | 11/1991 |
| WO | WO 93/04537 | 3/1993 |
| WO | WO 95/12858 | 5/1995 |
| WO | WO 95/22138 | 8/1995 |
| WO | WO 96/03839 | 2/1996 |
| WO | WO 96/27864 | 12/1996 |
| WO | WO 98/10358 | 3/1998 |
| WO | WO 98/11520 | 3/1998 |

OTHER PUBLICATIONS

PCT Notification of Transmittal of the International Search Report and the Written Opinion of the International Searching Authority, or the Declaration, mailed Sep. 25, 2008, in re PCT/US 07/11423 filed May 11, 2007 (8 pages).

Selected pages regarding Savi Technology, Inc., a Lockheed Martin Company; "*Savi Technology's Nested Visibility*"; obtained from http://www.savi.com/; 2 pages, Jan. 2008.

Selected pages regarding Savi Technology, Inc., a Lockheed Martin Company; "*Savi Products and Technology Overview*"; obtained from http://www.savi.com/products/; 2 pages, Jan. 2008

PCT Notification of Transmittal of the International Search Report and the Written Opinion of the International Searching Authority, or the Declaration, mailed Oct. 21, 2008, in re PCT/US07/05497, 7 pages.

Unknown, "Radio Frequency Identification (RFID)—Standards, Common Applications, A Look Ahead, and Recommended Reading," http://www.aimglobal.org/techinfo/rfid/rfidintro.html, 4, Jun. 7, 1999.

AIM International, Inc., "Radio Frequency Identification RFID—A Glossary: AIM International WP-98/001R," http://www.aimglobal.org/techinfo/rfid/aimrfidglossary, Jun. 7, 1999.

AIM International, Inc., "Radio Frequency Identification RFID—A Basic Primer: AIM International WP-98/002R," http://www.aimglobal.org/techinfo/rfid/aimrfidbasics.htm, Jun. 7, 1999.

International Search Report, Application No. PCT/US01/14467, 7 pages, Sep. 13, 2001.

International Search Report, Application No. PCT/US00/42802, 12 pages, Apr. 8, 2002.

International Search Report, Application No. PCT/US00/05772, 8 pages, Jul. 14, 2000.

International Search Report, Application No. PCT/US00/33569, 6 pages, Apr. 5, 2001.

Boehringer, "Integrated Security System and Method," U.S. Appl. No. 09/569,523, filed May 12, 2000.

Steeves, "Method and System for Networking Radio Tags in a Radio Frequency Identification System," U.S. Appl. No. 11/270,696, filed Nov. 9, 2005.

Beber et al., "Hybrid Radio Frequency Identification (RFID) Tag System," U.S. Appl. No. 11/615,743, filed Dec. 22, 2006.

Beber et al., "System and Method for Determining Location, Directionality, and Velocity of RFID Tags," U.S. Appl. No. 11/681,560, filed Mar. 2, 2007.

Griebenow et al., "Multi-Tag Tracking Systems and Methods," U.S. Appl. No. 11/688,681, filed Mar. 20, 2007.

Savi, A Lockheed Martin Company, Savi Technology: Savi Products and Technology Overview, selected pages from http://www.savi.com/products/overview.shtml, printed Jan. 4, 2008, 3 pages.

\* cited by examiner

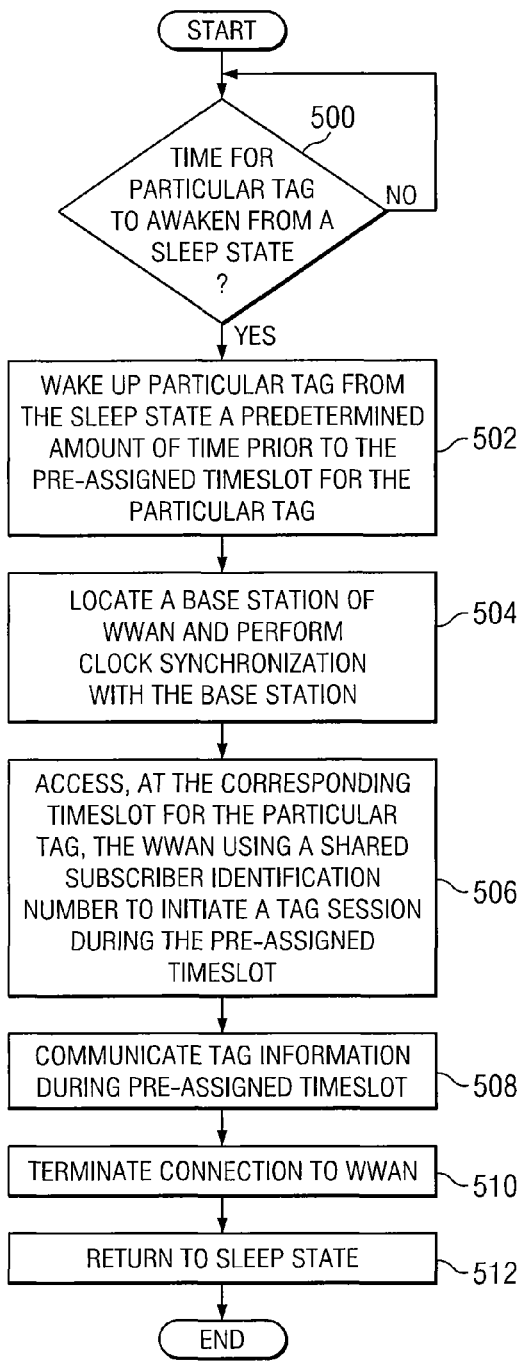
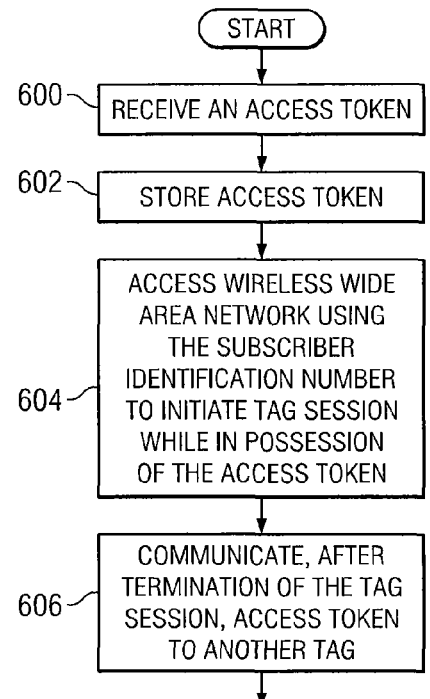
FIG. 5
FIG. 6

$FN = 51 [(T3-T2) \bmod 26] + T3 + 51*26*T1$
$T3 = 10*T3' + 1$

MULTIPLE RADIO FREQUENCY IDENTIFICATION (RFID) TAG WIRELESS WIDE AREA NETWORK (WWAN) PROTOCOL

TECHNICAL FIELD

This invention relates in general to radio frequency identification (RFID) systems, and more particularly to a multiple RFID tag wireless wide area network (WWAN) protocol.

BACKGROUND

The management and tracking of entities, such as personnel, assets, and other objects, is performed in a wide variety of environments and is often cumbersome, labor intensive, and expensive. Radio receivers and transmitters have been used to identify personnel and objects in such environments. For example, various systems are known for attaching radio frequency identification (RFID) tags to entities, such as personnel, assets, and automobiles. When automobiles equipped with radio tags enter a certain area, such as a toll booth area, the automobiles are automatically identified. The appropriate tolls are deducted from corresponding accounts, thereby eliminating the need for drivers to stop and make payments at toll booths. When radio tags are placed on personnel, they can be automatically identified and checked for authorized entry to a facility in a security application called access control. Assets which are tagged can be identified and tracked as they move throughout a facility for the purposes of automatically locating them. They can also be automatically counted therefore providing inventory control. They can also be protected as when an asset approaches an exit doorway the system can automatically determine if the asset is authorized to be removed from the facility. Tagged vehicles, assets, and personnel can be linked logically in the system to enable greater visibility and control.

SUMMARY

According to the present invention, disadvantages and problems associated with previous RFID tag systems and methods may be reduced or eliminated.

In certain embodiments, an RFID tag includes a memory module and one or more processing units. The memory module stores a subscriber identification number shared by the tag and one or more other tags for accessing a wireless wide area network (WWAN). Each tag is operable to access the WWAN using the subscriber identification number at a corresponding unique timeslot, the corresponding unique timeslot for a tag being distinct from the timeslots at which the other tags can access the WWAN using the subscriber identification number. The one or more processing units access the WWAN using the subscriber identification number to initiate a tag session at the corresponding unique timeslot for the tag. The corresponding unique timeslot for the tag is distinct from timeslots at which the other tags may access the WWAN using the subscriber identification number. The one or more processing units are operable to communicate tag information during the tag session at the corresponding unique timeslot for the tag.

In certain embodiments, a method includes storing a subscriber identification number shared by a particular tag and one or more other tags for accessing a WWAN. Each tag is operable to access the WWAN using the subscriber identification number at a corresponding unique timeslot for the tag, the corresponding unique timeslot for the particular tag being distinct from the timeslots at which the other tags can access the WWAN using the subscriber identification number. The method further includes accessing the WWAN using the subscriber identification number to initiate a tag session, the tag session being at the corresponding unique timeslot for the particular tag. The corresponding unique timeslot for the particular tag is distinct from timeslots at which the one or more other tags may access the WWAN using the subscriber identification number to initiate tag sessions. The method further includes communicating tag information during the tag session at the corresponding unique timeslot for the particular tag.

Particular embodiments of the present invention may provide one or more technical advantages. Conventional information systems typically communicate with RFID tags via relatively short-range wireless networks and local area networks (LANs), often installed indoors and/or across relatively small areas. For example, an infrastructure that includes RFID tag readers and/or activators may communicate with RFID tags via relatively short-range wireless networks. However, these types of networks are not always available or conveniently deployable for certain classes of applications. As just a few examples, it is highly unlikely that a reliable LAN infrastructure will be readily available for applications such as disaster response, emergency evacuation, construction site monitoring, and roadway transport.

The present invention allows multiple RFID tags to communicate using a WWAN. Using certain potential techniques for accessing a WWAN, WWAN access for RFID tags could be relatively expensive and power-consumption intensive when compared to LAN access. For example, registering each RFID tag with a unique subscriber identification number (e.g., cellular telephone number) may be cost prohibitive on a subscription basis for most applications. Assigning unique subscriber identification numbers (e.g., cellular telephone numbers) to individual RFID tags may be difficult or impossible, as the number of available subscriber identification numbers may be depleted quickly if a large number of tags use them. This may be particularly true in the case of cellular telephone numbers, as cellular telephones and other devices are also assigned at least one of the available set of cellular telephone numbers for accessing WWANs.

In certain embodiments, the present invention provides a workable solution for RFID tags to communicate using a WWAN. For example, certain embodiments of the present invention enable cellular telephone numbers (or other subscriber identification numbers) to be scaled for use with RFID tags (e.g., by sharing a single cellular telephone number among a number of RFID tags rather than each individual tag having its own cellular telephone number). Certain embodiments of the present invention allow multiple RFID tags to seamlessly share the same subscriber identification number without violating WWAN network access standards. For example, the present invention may provide a way for tags to time-share the WWAN using a single subscriber identification number without resulting in collisions or black-listing (i.e., by attempting to use the same subscriber identification number for simultaneous access to the WWAN). In certain embodiments, the present invention allows multiple RFID tags to share a common subscriber identity while enhancing power management. Enabling RFID tags to communicate using a WWAN may increase the potential range of RFID tags, where desirable.

Certain embodiments of the present invention allow the infrastructure for WWANs to be leveraged for use with RFID tags, which may be particularly useful in situations where typical RFID infrastructures (e.g., readers, activators, etc.)

may not be available (e.g., due to timing constraints) or may not be otherwise cost-effective. For example, the present invention may allow RFID capabilities to be provided on the fly, such as at emergency triage centers.

Certain embodiments of the present invention may provide some, all, or none of the above advantages. Certain embodiments may provide one or more other technical advantages, one or more of which may be readily apparent to those skilled in the art from the figures, descriptions, and claims included herein.

BRIEF DESCRIPTION OF THE DRAWINGS

For a more complete understanding of the present invention and its advantages, reference is made to the following descriptions, taken in conjunction with the accompanying drawings, in which:

FIG. 5 illustrates an example method for accessing a WWAN according to a fixed-length session technique;

FIG. 6 illustrates an example method for accessing a WWAN according to a variable-length session technique;

DESCRIPTION OF EXAMPLE EMBODIMENTS

Figure 1:
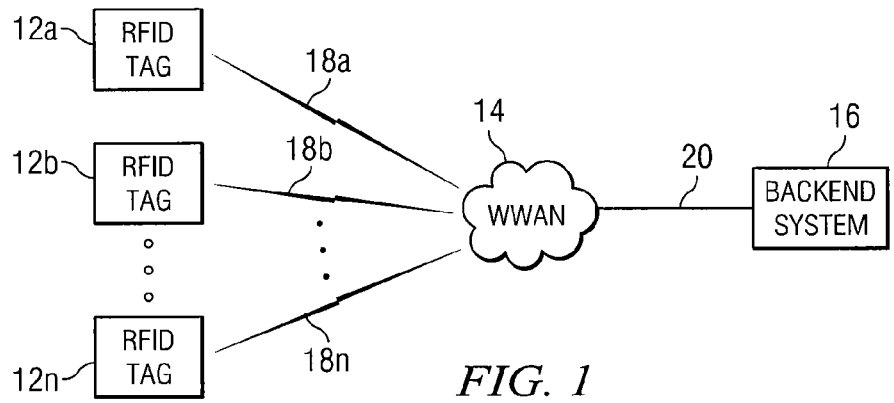
FIG. 1 illustrates an example system in which a number of RFID tags are operable to communicate over a WWAN, according to certain embodiments of the present invention.

FIG. 1 illustrates an example system 10 in which a number of radio frequency identification (RFID) tags are operable to communicate over a wireless wide area network (WWAN), according to certain embodiments of the present invention. In the illustrated example, system 10 includes a number of RFID tags 12, a WWAN 14, and one or more backend systems 16. Although a particular embodiment of system 10 is illustrated and primarily described, the present invention contemplates any suitable embodiment of system 10. In general, system 10 implements a multiple RFID tag WWAN protocol that allows a number of RFID tags 12 to share a single subscriber identification number (e.g., a cellular telephone number) to access and communicate over WWAN 14.

System 10 includes one or more RFID tags 12. In general, RFID tags 12 are portable tags that may be affixed to any suitable type of entity. For example, tags 12 may be affixed to and identify mobile entities such as any suitable combination of persons, vehicles, or pieces of inventory. RFID tags 12 may serve any combination of a variety of purposes, such as tracking their associated entity (or entities), accounting for their associated entity (or entities), reporting conditions related to their associated entity (or entities), or any other suitable purpose. Each tag 12 may have an associated unique ID.

WWAN 14 may include any suitable type of wireless network that uses cellular network technology and is accessed using a subscriber identification number. A portion or all of WWAN 14 may be wireline network, as long as access to the network is made wirelessly by tags 12 using a subscriber identification number. A particular example implementation of the present invention in which WWAN 14 comprises a Global System for Mobile Communications (GSM) network is described in more detail below. Tags 12 access WWAN 14 using a subscriber identification number and a corresponding wireless link 18.

RFID tags 12 may access WWAN 14 to communicate tag information to one or more appropriate destinations (e.g., to one or more backend systems 16, described below). For purposes of this description, tag 12 communicating tag information may include tag 12 transmitting and/or receiving tag information. Tag information may include any suitable data to be transmitted or received by tag 12. For example, tag information 314 may include the unique ID of tag 12, timing information, sensor data collected by tag 12, or any other suitable type of data, according to particular needs.

Mobile units, such as cellular telephones, typically access a WWAN, such as WWAN 14, using a subscriber identification number. For example, a mobile unit (e.g., a cellular telephone) may access a WWAN by initiating a cellular telephone call, and the mobile unit is identified to the WWAN using the subscriber identification number. A subscriber identification number may include any suitable identifier for identifying a subscriber for use in accessing WWAN 14. For example, the subscriber identification number may include a cellular telephone number, an international mobile subscriber identity (IMSI), or any other suitable identifier.

To access WWAN 14, a tag 12 may also use a subscriber identification number. Certain embodiments of the present invention provide techniques for sharing a single subscriber identification number among a number of tags 12. Under certain circumstances, multiple RFID tags 12 cannot share a subscriber identification number because doing so will likely interfere with the standards or other protocols established for WWAN systems. For example, most WWAN networks (e.g., GSM) will "black-list" subscriber identification numbers (e.g., of phones) that appear to be simultaneously requesting service. Certain embodiments of the present invention provide techniques for sharing a single subscriber identification number among a number of tags 12. For purposes of this description, a group of tags 12 that share a subscriber identification number for accessing WWAN 14 may be referred to as a logical subscriber entity.

Although a subscriber identification number is primarily described, the present invention contemplates tags 12 using other information in addition to or in place of the subscriber identification number for accessing WWAN 14. For example, in addition to a subscriber identification number, tags 12 may also use a separate authentication number when accessing WWAN 14. If appropriate, this other information may be shared among tags 12 in a substantially similar manner to the way in which the subscriber identification number is shared among tags 12.

A tag 12 typically accesses WWAN 14 using a subscriber identification number by establishing a connection (e.g., link 18) to WWAN 14. For example, a tag 12 may establish a connection (e.g., link 18) to WWAN 14 by initiating a wireless call. The wireless call placed by RFID tags 12 using the single, shared subscriber identification number are to be distinguished from the traditional wireless signals communicated by RFID tags over short-range wireless networks and LANs.

According to certain embodiments of the present invention, tags 12 of a logical subscriber entity may each access WWAN 14 using the subscriber identification at a corresponding unique timeslot for the tag 12. The corresponding unique timeslot for each tag 12 is distinct from the timeslots at which the other tags 12 of the logical subscriber entity can access WWAN 14 using the subscriber identification number. In this way, each tag 12 of the logical subscriber entity can access WWAN 14 using the single, shared subscriber identification number in a unique corresponding timeslot for the tag 12. This may reduce or eliminate the possibility that multiple tags 12 simultaneously attempt to access WWAN 14 using the same subscriber identification number and thereby violate policies of WWAN 14. Tags 12 may be preprogrammed to share a subscriber identification number according to the present invention.

In operation of an example embodiment of system 10, a particular tag 12 shares a subscriber identification number for accessing WWAN 14 with one or more other tags 12, the particular tag 12 and the one or more other tags 12 collectively forming a logical subscriber entity. Each tag 12 in the logical subscriber entity may be operable to access the WWAN 14 using the single, shared subscriber identification number at a corresponding unique timeslot for the tag 12, the corresponding unique timeslot for the tag being different than the corresponding timeslots at which the other tags 12 can access WWAN 14 using the subscriber identification number.

The particular tag 12 may access WWAN 14 using the subscriber identification number to initiate a tag session, the tag session being at the corresponding unique timeslot for the particular tag 12. The corresponding unique timeslot for the particular tag 12 is distinct from the corresponding timeslots at which the one or more other tags 12 may access WWAN 14 using the subscriber identification number to initiate tag sessions. To access WWAN 14, the particular tag 12 may establish a connection (e.g., link 18) with WWAN 14. For example, at the corresponding unique timeslot for the particular tag 12, the particular tag 12 is operable to access WWAN 14 using the subscriber identification number by initiating a wireless call on WWAN 14 using the subscriber identification number.

In certain embodiments, the particular tag 12 may access WWAN 14 according to a fixed-length session technique, as described in more detail below. In certain embodiments, the particular tag 12 may access WWAN 14 according to a variable-length session technique, as will be described in more detail below.

The particular tag 12 may communicate tag information 314 during the tag session at the corresponding unique timeslot for the particular tag 12. In certain embodiments, the particular tag 12 may communicate tag information to one or more backend systems 16 (described below) via WWAN 14. It should be understood that, for the purposes of this description, communicating tag information may include any suitable combination of transmitting and/or receiving tag information.

The particular tag 12 may terminate its connection (e.g., link 18) to WWAN 14. For example, the particular tag 12 may terminate the wireless call with WWAN 14, the connection may time out (e.g., due to meeting some predefined condition), or the connection may be terminated in any other suitable manner.

The particular tag 12 may repeated these operations each time a corresponding timeslot for the particular tag 12 occurs. For example, tags 12 may repeatedly cycle through a fixed time frame (e.g., one hour). Each tag 12 may divide its payload (i.e., tag information 314) over a number of corresponding timeslots (and tag sessions), if appropriate. For example, if the corresponding timeslot for a tag 12 is insufficient for the tag 12 to communicate its desired tag information, the tag 12 may transmit the remainder of the desired tag information over one or more next corresponding timeslots in one or more future fixed time frames. In other words, each logical subscriber identity member tag 12 may segment its data payload (e.g., of tag information) to fit across multiple tag sessions.

Figure 2:
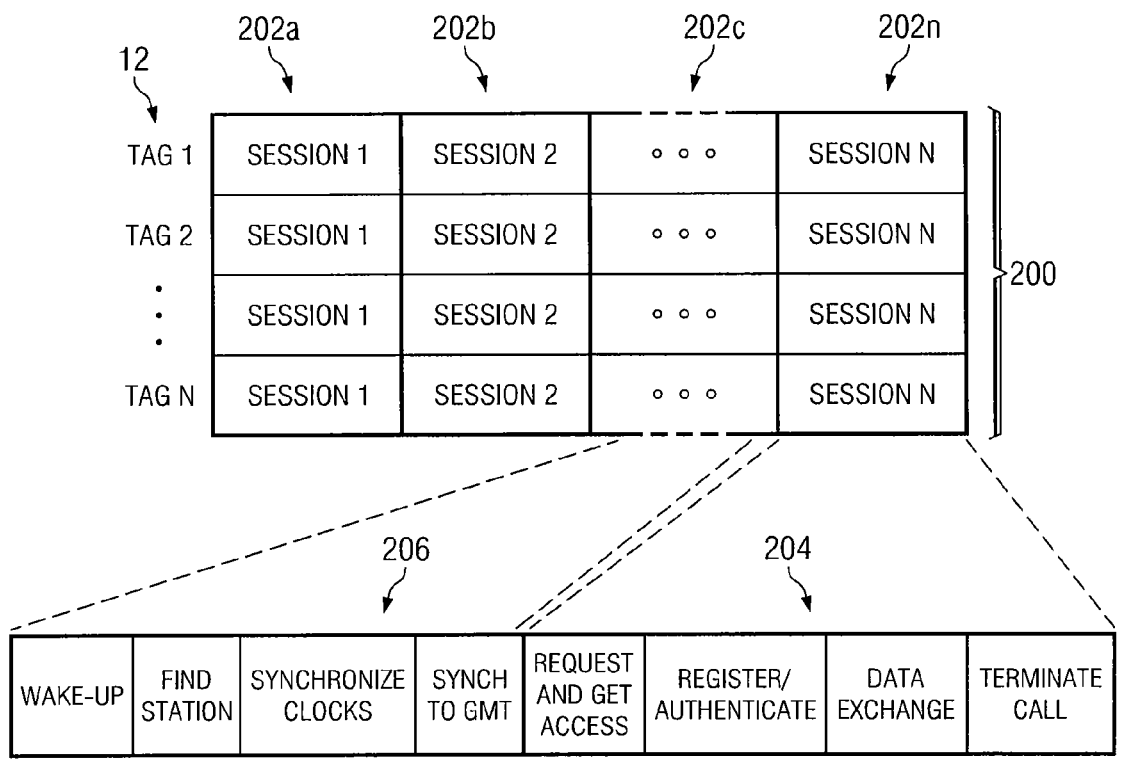
FIG. 2 illustrates an example of a tag session division multiple access concept for WWAN systems, according to certain embodiments of the present invention.

FIG. 2 illustrates an example of a tag session division multiple access concept for WWAN systems (e.g., WWAN 14), according to certain embodiments of the present invention. As described above, two or more tags 12 may use a single subscriber identification number for accessing WWAN 14 and communicating tag information over WWAN 14. In certain embodiments, the number of tags 12 that share the single subscriber identification number may be predetermined.

As shown in FIG. 2, a fixed time frame 200 (e.g., one hour) may be divided into a number of timeslots 202. Tags 12 may use these timeslots 202 to access WWAN 14 using the subscriber identification number to initiate tag sessions for communicating tag information. As described briefly above, each tag 12 may access WWAN 14 using the subscriber identification number at a corresponding unique timeslot 202 for the tag 12. In this example, timeslot 202a may correspond uniquely to tag 1, timeslot 202b may correspond uniquely to tag 2, and timeslot 202n may correspond uniquely to tag N.

The connection of a tag 12 to WWAN 14 during the corresponding timeslot 202 for the tag 12 may be referred to as a tag session. During such a tag session at the corresponding timeslot 202 for a tag 12, the tag 12 can communicate tag information, if appropriate. Tag 1 may access WWAN 14 at timeslot 202a to initiate a tag session (tag session 1) at the corresponding unique timeslot (timeslot 202a) for tag 1. Tag 2 may access WWAN 14 at timeslot 202b to initiate a tag session (tag session 2) at the corresponding unique timeslot (timeslot 202b) for tag 2. Tag N may access WWAN 14 at timeslot 202n to initiate a tag session (tag session N) at the corresponding unique timeslot (timeslot 202n) for tag 2. As will be discussed in more detail below, the durations of all timeslots 202 may be the same, or the durations of timeslots 202 may vary, according to particular needs.

In certain embodiments, a timeslot 202 comprises sufficient time to set up a connection (e.g., link 18), such as a cellular call, to WWAN 14 and communicate data (e.g., tag information. This may help ensure that only one tag 12 makes a call at any given time and that call-time attempts do not overlap. Factors in the timeslot 202 duration may include the total amount of time to random access channel (RACH), access grant channel (AGCH), shared control channel (SCCH), send data, and end the call.

As indicated at reference numeral 204, during a tag session at a corresponding unique timeslot 202 for a tag 12, the tag 12 may perform one or more of the following operations: (1) request access to and gain access to WWAN 14 using the shared subscriber identification number (and any other suitable information); (2) register/authenticate itself to WWAN 14 using the shared subscriber identification number (and any other suitable information); (3) communicate tag information; and (4) terminate the connection to WWAN 14. In certain embodiments, no transmissions are made to or from tags 12 during timeslots 202 that are not assigned to a tag 12. In certain embodiments, the typical transmission duration may be equal to the allotted size of timeslot 202.

In certain embodiments, for at least a portion of the time a tag 12 is not engaged in a tag session, tag 12 may reside in a sleep state. As just one example, a sleep state may include a low power state in which tag 12 maintains sufficient power to operate an internal clock (and any other suitable operations, according to particular needs). As shown at reference numeral 206 with respect to tag N, tag 12 may be configured to wake up from the sleep state a predetermined amount of time prior to the corresponding unique timeslot for tag 12 in order to locate a base station, synchronize clocks with the base station, and synchronize clocks to Greenwich Mean Time (GMT). For example, tag 12 may wake up a predetermined amount of time prior to the corresponding unique timeslot 202 for the tag. Tag 12 may use the internal clock running at low power to determine when its corresponding unique timeslot 202 is approaching and when the predetermined time ahead of the corresponding unique timeslot 202 for the tag 12 has arrived (and the tag 12 should wake up).

The number of bits communicated by a tag 12 during a tag session may vary with the connection data rate and the type of WWAN 14. Taking the Cellular Digital Packet Data (CDPD) network as an example, a 28.8 kbps connection rate may include twice as many bits per session as a 14.4 kbps connection rate. The number of unique tag sessions per fixed time frame 200 may also be configurable. For this description, it will be assumed that each one-hour fixed time frame 200 will consist of a certain number of tag sessions; however, this is for example purposes only.

The actual duration of timeslot 202 may depend on the WWAN 14 type. This description focuses on an example in which WWAN 14 comprises the GSM network; however, this is for example purposes only. Therefore, the duration of timeslot 202 may be at least that the total time for finding a base-station, registering a subscriber identity, establishing a call, exchanging data, and terminating the call. For GSM networks, it typically takes about 5 seconds to establish a call and transmit a single packet of data consisting of 114 bits. However, the timeslot 202 may be longer depending on the network and data traffic conditions. For example, the duration of timeslot 202 can be preconfigured for time-out after about 10 seconds. In certain embodiments, tags 12 typically only need a short time on WWAN 14 since tags 12 are usually just sending very small packets (e.g., an identification or alert message).

Returning to FIG. 1, timeslots 202 for tags 12 to engage in tag sessions may be determined in a number of ways. Two example techniques will be described herein, a first referred to as a fixed-length session technique and a second referred to as a variable-length session technique. As will be described in more detail below, these techniques may be combined, if appropriate.

Fixed-Length Session Technique

In certain embodiments, the duration of timeslots 202 (and the durations of tag sessions) for tags 12 is pre-determined (e.g., fixed) for each logical subscriber identity member tag 12. According to this technique, the corresponding timeslot 202 for a tag 12 may have a predetermined start time and a fixed duration. In certain embodiments, the fixed durations of the tag sessions for all of the tags 12 of a logical subscriber entity may be equal, if appropriate. In other embodiments, the fixed durations of timeslots 202 for each tag may vary, if appropriate. For example, a first tag 12 in a logical subscriber entity may have a corresponding unique timeslot 202 having a first fixed duration, and a second tag 12 in the logical subscriber entity may have a corresponding unique timeslot 202 having a second fixed duration that is different that the first fixed duration. Each tag 12 of the logical subscriber identity may be preprogrammed to communicate in the uniquely assigned fixed timeslot 202 within fixed time frame 200 (e.g. 1-hour), referenced to GMT or another suitable standard time. The duration of timeslots 202 can be fixed to a time-out period, such that if the tag session for tag 12 exceeds the fixed corresponding timeslot 202 for the tag 12, the tag session (and connection to WWAN 14) times out.

In certain embodiments, the duration of a fixed-length timeslot 202 is the maximum expected duration (or a time-out equivalent) for finding a network (e.g., WWAN 14), registering with the network, authenticating with the network, establish a connection with the network, communicating data (e.g., tag information) over the network, and terminating the network connection. This duration may be rounded to the nearest WWAN multi-frame, if appropriate. Currently, a GSM multi-frame is approximately 235 milliseconds. The actual duration of the tag session may be less than the time-out duration, depending on availability of WWAN 14 and signal conditions. In certain embodiments, if an attempt is made to assign a shorter timeslot 202, then logical subscriber identity member tags 12 may overlap and violate network access parameters of WWAN 14.

In certain embodiments, each logical subscriber identity member tag 12 may be pre-assigned a timeslot number and the predetermined timeslot duration at the time of deployment of tags 12. A member tag 12 may enter a sleep mode and maintain a low-power timer in order to determine when it must awaken to locate a base station of WWAN 14. A tag 12 may wake up a pre-determined amount of time before its pre-assigned tag session in order to listen for the base station broadcast (beacon) channels, synchronize the internal clock of the tag 12, and synchronize the real-time clock of the tag 12 with GMT (or another standard) time. In certain embodiments, when listening for a network signal outside of the assigned tag session, a transmitter of tag 12 may be disabled so that tag 12 cannot access WWAN 14 using the shared subscriber identification number.

If tag 12 implements a tag session duration that is shorter than one hour, then the network time alone may suffice. This may assume that all networks are synchronized to real-time around the world. For any tag session duration greater than one hour, it may be appropriate for logical subscriber identity member tags 12 to synchronize to GMT time. If the WWAN 14 implements world time in GMT format, then it may not be necessary for the tag 12 to determine its time zone. If WWAN 14 implements only local time format, then tag 12 may be preprogrammed with its time zone, utilize a global positioning system (GPS) receiver to determine its time zone, implement an atomic-clock receiver to determine the present GMT time, or otherwise determine a standard time. Accurate synchronization with real time may allow tags 12 to be physically separate and communicate without overlap from anywhere in the world. In addition, each unique timeslot 202 may be separated in time from each other by at least one WWAN multi-frame. This separation may be wide enough (e.g., at least one GSM 51 multi-frame) to possibly ensure that there will be no overlap in timeslots even if base stations of WWAN 14 are slightly off from GMT time.

In certain embodiments, tags 12 enable their transmitters after their internal real-time clocks are synchronized with real-time. Once a tag 12 is synchronized to real-time and communicating with a base station of WWAN 14, tag 12 may remain awake and synchronized to WWAN 14 and begin a count-down towards its unique timeslot 202. In certain embodiments, if tag 12 loses connectivity to WWAN 14 during this process, tag 12 may re-establish a connection to a base-station of WWAN 14 and re-synchronize the real-time clock of tag 12. Upon reaching its corresponding unique timeslot 202, tag 12 may attempt to initiate a tag session by establishing network access and data communication. If the connection fails during a tag session, tag 12 may try again to establish a connection until the corresponding unique timeslot 202 expires. Once the corresponding unique timeslot 202 expires, tag 12 may return to a sleep state, maintain its internal real-time clock, and retry at its next corresponding unique timeslot 202. Tag 12 may maintain a pointer to its internal data set (e.g., a first-in, first out queue) to determine when tag 12 has completed communicating its data set (e.g., tag information).

In operation of an example embodiment of system 10 in which the fixed-length session technique is used, tags 12 may store timeslot information identifying the corresponding timeslot 202 for the tag 12 to conduct a tag session. The corresponding timeslot 202 for the tag 12 may have a predetermined start time and duration, and may be pre-assigned to the tag 12 for the tag 12 to conduct the tag session. In this embodiment, the duration of the corresponding timeslot 202 for the tag 12 is fixed, such that the tag session is fixed. In certain embodiments, tags 12 may remain in a sleep state between instances of their corresponding unique timeslots 202.

A particular tag 12 may determine whether it is time to awaken from a sleep state. Each tag 12 may be configured to wake up from the sleep state a predetermined amount of time prior to the pre-assigned timeslot 202 for the tag 12. In certain embodiments, the particular tag 12 may use an internal clock to determine when its corresponding timeslot 202 is approaching and when the predetermined time ahead of the corresponding unique timeslot 202 for the particular tag 12 has arrived (and the particular tag 12 should wake up).

If the particular tag 12 determines that it is not time to awaken from the sleep state, then the particular tag 12 may remain in the sleep state until it is time for the particular tag 12 to wake up (or the particular tag 12's inclusion in the logical subscriber entity is otherwise terminated). If the particular tag 12 determines that it is time to wake up from the sleep state, then the particular tag 12 may wake up from the sleep state a predetermined amount of time prior to the pre-assigned timeslot 202 for the particular tag 12.

The particular tag 12 may, after waking up and prior to accessing WWAN 14 using the shared subscriber identification number, locate a base station of WWAN 14 and perform clock synchronization with the base station. In certain embodiments, an internal clock of the particular tag 12 may be synchronized to the network time (e.g., of WWAN 14). The particular tag 12 may listen to the base station signal of the located base station of WWAN 14, and may perform synchronization according to a located signal. In certain embodiments, tags 12 are aware of their time zone and correct their timeslot counters internally.

Once the corresponding timeslot 202 for the particular tag 12 has arrived, the particular tag 12 may access WWAN 14 using the shared subscriber identification number, as described above, to initiate a tag session during the pre-assigned timeslot 202. The particular tag 12 may communicate tag information during the pre-assigned timeslot 202, as described above. In certain embodiments, tag information communicated during the tag session for the tag comprises one or more fixed-length data packets. This may facilitate keeping the sizes of timeslots 202 constant, if appropriate. The particular tag 12 may terminate its connection (e.g., link 18) to WWAN 14 and may return to a sleep state. This cycle may be repeated as often as is appropriate.

Variable-Length Session Technique

In certain embodiments, the present invention may be implemented using a variable-length session technique in which the durations of corresponding timeslots 202 for tags 12 may vary and may not be fixed for each particular tag. The variable-length session technique may be implemented in any suitable manner, according to particular needs. In certain embodiments, the variable-length session technique may be implemented through token sharing. For example, using the token-sharing approach, the member tags 12 of a logical subscriber entity may exchange an access token to determine which tag has the right to access WWAN 14 using the subscriber identification number. The access token may be tied to a shared, unique logical subscriber identity number (e.g., the subscriber identification number).

A tag 12 may communicate the access token to another tag 12 using a secondary and more direct data exchange mechanism between tags 12. As just one example, this secondary data exchange may be implemented using a wireless mesh network. The present invention contemplates any other suitable technique for exchanging an access token between or among tags 12. In certain embodiment, the wireless mesh network may utilize the same transceiver as is used to communicate with WWAN 14 but in a different frequency band, (e.g., the 868 MHz, 915 MHz, or 2.4 GHz ISM bands, which is fairly close to the 900 MHz, 1800 MHz, or 1900 MHz GSM bands).

In operation of an example embodiment of system 10 in which the variable-length session technique is used, a particular tag 12 may receive an access token authorizing the particular tag 12 to access WWAN 14 using the shared subscriber identification number while the particular tag 12 is in possession of access token. The access token may be received from any suitable source. As a first example, the particular tag 12 may be preprogrammed to be the first tag 12 in a logical subscriber entity to communicate, and thus may be initialized as the first tag 12 in the logical subscriber entity to possess the access token. As another example, the particular tag 12 may receive the access token from another tag 12 in the logical subscriber entity. In certain embodiments, the particular tag 12 may be in a sleep state (e.g., to conserve power), and the receipt of the access token may cause the particular tag 12 to awaken from its sleep state.

The particular tag 12 may access WWAN 14 using the shared subscriber identification number to initiate a tag session while the particular tag 12 is in possession of the access token. For example, the particular tag 12 may access the WWAN 14 as described above. The corresponding timeslot 202 for the particular tag 12 in this case may be the time that the particular tag 12 is in possession of the access token (and the access token is valid for the particular tag 12) and is thus authorized to access WWAN 14 using the subscriber identification number to initiate a tag session.

The particular tag 12 may communicate tag information during the tag session, as described above for example. It should be understood that, for the purposes of this description, communicating tag information may include any suitable combination of transmitting and/or receiving tag information.

After termination of the tag session, the particular tag 12 may communicate the access token to another tag 12. A tag 12 may pass the token on to another tag 12 within mesh network range. In certain embodiments, it may be desirable for tag 12 to pass the token as soon as (or as nearly as practicable) the tag 12 completes its transaction or when tag 12 has no pending transactions. The token-passing algorithm may be any suitable token-passing algorithm, according to particular needs.

The present invention contemplates termination of the tag session for any suitable reason. As a first example, the tag session may last as long as the particular tag 12 has tag information to communicate. As a second example, the access token may authorize its possessor to communicate a particular number of bits of data (or the tag 12 may otherwise be preset to communicate only a certain number of bits).

In certain embodiments, the access token may be valid for use by the particular tag 12 for a predetermined time period, after which the particular tag 12 may no longer be authorized to access WWAN 14 using the subscriber identification number (i.e., the access token is no longer valid for the particular tag 12). In other words, the access token may have an expiration time, which may prevent any one tag 12 in the logical subscriber entity from monopolizing the access token. The time limit for the access token may be implemented in any suitable manner, according to particular needs. As just one example, the access token may include an internal timer. After the access token expires, the particular tag 12 may be forced to terminate its connection to WWAN 14 and to communicate the access token to another tag 12. In such embodiments, it is possible that the particular tag 12 tag may not complete communication of its appropriate tag information prior to termination of the tag session. In such a scenario, the particular tag 12 may resume communication of the tag information when the particular tag 12 receives the access token again in the future.

The determination of the tag 12 to which the particular tag 12 should pass the access token may be made in any suitable manner, according to particular needs. In certain embodiments, the particular tag 12 accesses a routing table to determine the tag 12 to which the access token should be transmitted. In certain embodiments, tags 12 that are either out of range (i.e., out of mesh network range with other logical subscriber identity member tags 12) or not responding (e.g., because they are disabled, out of range, low battery, etc.) are removed from the key-exchange and routing tables. Those tags 12 may revert to a fixed session assignment, if appropriate. If those tags 12 return to the mesh network, they may request access to the access token.

According to the variable-length session technique, it may be possible for the durations of tag sessions to vary from tag 12 to tag 12. For example, a first tag 12 may communicate a relatively small amount of tag information and may quickly pass the access token to the next tag 12. However, the next tag 12 may have a relatively large amount of tag information to communicate, which may result in the next tag 12 holding the access token for a longer period of time and thereby have a tag session of a longer duration.

Although a single iteration has been described, it will be understood that the particular tag 12 may wait to receive the access token again to communicate tag information. Once the particular tag 12 receives the access token again, it may repeat at least a portion of the operations described above. In certain embodiments, the particular tag 12 may enter a sleep state for at least a portion of the time that it is waiting for the access token.

The present invention contemplates tags 12 being operable to share a subscriber identification number according to both the fixed-length and variable techniques, and being able to make such a determination in real time. For example, tags 12 may be preprogrammed to be capable of operating using either of the fixed-length or variable-length session techniques, and may determine which is more appropriate to use in real time.

As a particular example, tags 12 of a logical subscriber entity may determine whether the tags 12 can communicate directly with one another, in a wireless mesh network for instance. If it is determined that tags 12 can communicate directly with one another, then tags 12 may initiate tag sessions according to a variable-length session technique. If it is determined that tags 12 are not able to communicate directly with one another, then tags 12 may initiate tag sessions according to a fixed-length session technique.

Although the fixed-length session technique may be used in any suitable situation without departing from the present invention, the fixed-length session technique may be particularly suitable for large tag sensor fields that monitor events and communicate slowly over time. Additionally, although the variable-length session technique may be used in any suitable situation without departing from the present invention, the variable-length session technique may be particularly suitable for real-time alerting applications, such as distress calling or access control for logical subscriber identity tags 12 that will be within mesh network proximity of each other. For example, token exchange algorithms can take into account the type of sensors (e.g. alarms and hazardous material sensors) and their priority for communications in a mesh network. The variable-length approach may be particularly suited for applications in which it is known, expected, or possible that tags 12 will be in relatively close proximity to one another (e.g., close enough to communicate with one another, such as in a wireless mesh network). An example application in which the variable length approach may be useful is for emergency evacuation type applications where the application area is local.

In certain embodiments, the fixed-length session technique involves a trade-off in the number of tags 12 that can access WWAN 14 within a given time frame 200. For example, with 10-second timeslots 202, 3600/10=360 individual tags 12 can access WWAN 14 each hour. However, each tag 12 may wait 1 hour before regaining access to WWAN 14. If the cycle time is decreased to allow for access to WWAN 14 once every 10 minutes, then the number of appropriate logical subscriber identity member tags 12 in this example may be decreased to 60.

Regardless of which technique is used, it is possible that when the corresponding timeslot 202 for a particular tag 12 arrives (e.g., either because the fixed start time arrives or because the particular tag receives the access token), the particular tag 12 may not have any tag information to communicate. The particular tag 12 may handle such a scenario in any suitable manner, according to particular needs. In certain embodiments, prior to accessing WWAN 14 at its corresponding timeslot 202, each tag 12 may determine whether it has any tag information to transmit. If the tag 12 has tag information to transmit, then the tag 12 may access WWAN 14 at its corresponding timeslot 202 and transmit the tag information. If the tag 12 does not have tag information to transmit, then the tag 12 may forego accessing WWAN 14 at its corresponding timeslot 202. In the token-sharing approach, the tag 12 may simply pass on the access token to the next appropriate tag 12. On the other hand, even if tag 12 does not have tag information to transmit, it may still be appropriate for tag 12 to access WWAN 14 to possibly receive tag information.

In certain embodiments, each tag 12 may store a packet counter comprising an identification of a number of packets (e.g., of tag information) that have been transmitted from the tag 12. Tag 12 may update the packet counter each time a packet is communicated from the tag. The packet counter may be used to determine how many times the tag 12 should wake up and communicate tag information in the corresponding timeslot 202 for the tag 12.

As described briefly above, system 10 may include backend system 16. Backend systems 16 may include one or more receivers, one or more servers, or any other suitable devices. In certain embodiments, backend system 16 is operable to receive data communicated from tags 12 over WWAN 14 (e.g., tag information communicated by tags 12). Although a single backend system 16 is illustrated and primarily described, the present invention contemplates system 10 including any suitable number and types of backend systems 16 according to particular needs. Backend system 16 may be coupled to WWAN 14 via link 20. Link 20 may include one or more wired or wireless connections in any suitable combination.

Backend system 16 may include one or more processing modules and one or more memory modules. The one or more processing modules (e.g., a microprocessor) may include one or more processing units, which may include one or more microprocessors, controllers, or any other suitable computing devices or resources. Each memory module may take the form of volatile or non-volatile memory including, without limitation, magnetic media, optical media, random access memory (RAM), read-only memory (ROM), removable media, or any other suitable memory component. In certain embodiments, a memory module comprises one or more databases, such as one or more structure query language (SQL) databases. Backend system 16 may store a portion or all of the data received from tags 12 over WWAN 14. Backend system 16 may perform any suitable processing of the data received from tags 12 over WWAN 14.

Particular embodiments of the present invention may provide one or more technical advantages. Conventional information systems typically communicate with RFID tags via relatively short-range wireless networks and local area networks (LANs), often installed indoors and/or across relatively small areas. For example, an infrastructure that includes RFID tag readers and/or activators may communicate with RFID tags via relatively short-range wireless networks. However, these types of networks are not always available or conveniently deployable for certain classes of applications. As just a few examples, it is highly unlikely that a reliable LAN infrastructure will be readily available for applications such as disaster response, emergency evacuation, construction site monitoring, and roadway transport.

The present invention allows multiple RFID tags 12 to communicate using a WWAN 14. Using certain potential techniques for accessing a WWAN 14, WWAN access for RFID tags could be relatively expensive and power-consumption intensive when compared to LAN access. For example, registering each RFID tag with a unique subscriber identification number (e.g., cellular telephone number) may be cost prohibitive on a subscription basis for most applications. Assigning unique subscriber identification numbers (e.g., cellular telephone numbers) to individual RFID tags may be difficult or impossible, as the number of available subscriber identification numbers may be depleted quickly if a large number of tags use them. This may be particularly true in the case of cellular telephone numbers, as cellular telephones and other devices are also assigned at least one of the available set of cellular telephone numbers for accessing WWANs.

In certain embodiments, the present invention provides a workable solution for RFID tags 12 to communicate using WWAN 14. For example, certain embodiments of the present invention enable cellular telephone numbers (or other subscriber identification numbers) to be scaled for use with RFID tags 12 (e.g., by sharing a single cellular telephone number among a number of RFID tags 12 rather than each individual tag having its own cellular telephone number). Certain embodiments of the present invention allow multiple RFID tags 12 to seamlessly share the same subscriber identification number without violating WWAN network access standards. For example, the present invention may provide a way for tags to time-share WWAN 14 using a single subscriber identification number without resulting in collisions or black-listing (i.e., by attempting to use the same subscriber identification number for simultaneous access to WWAN 14). In certain embodiments, the present invention allows multiple RFID tags 12 to share a common subscriber identity while enhancing power management. Enabling RFID tags 12 to communicate using WWAN 14 may increase the potential range of RFID tags 12, where desirable.

Certain embodiments of the present invention allow the infrastructure for WWANs to be leveraged for use with RFID tags 12, which may be particularly useful in situations where typical RFID infrastructures (e.g., readers, activators, etc.) may not be installable or available (e.g., due to timing constraints) or may not be otherwise cost-effective. For example, the present invention may allow RFID capabilities to be provided on the fly, such as at emergency triage centers.

Figure 3:
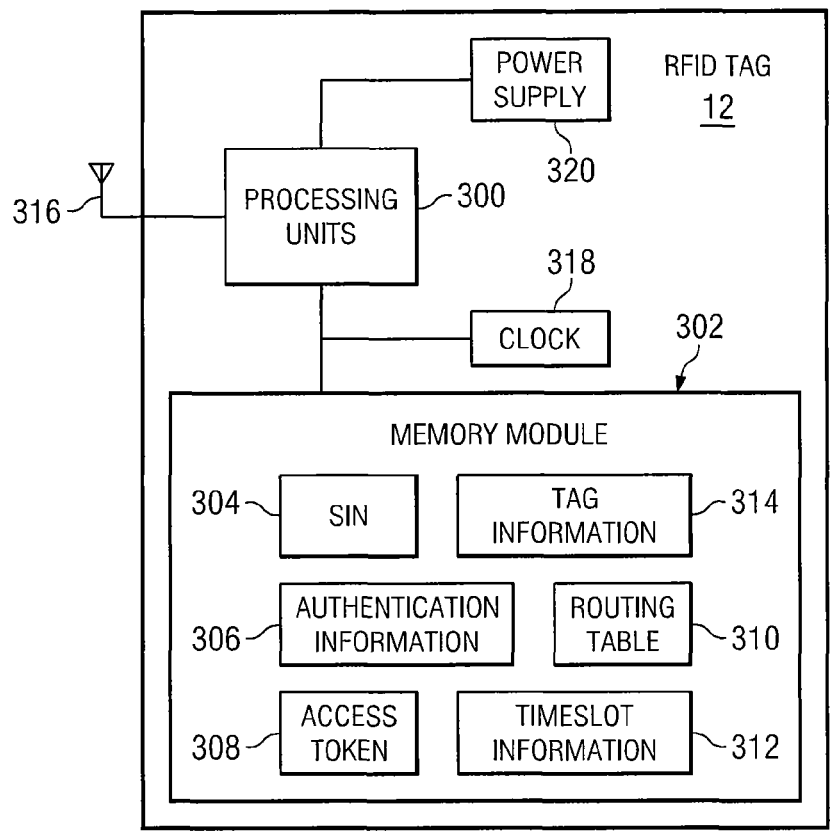
FIG. 3 illustrates an example RFID tag, according to certain embodiments of the present invention.

FIG. 3 illustrates an example RFID tag 12, according to certain embodiments of the present invention. RFID tag 12 may be any suitable type of RFID tag, such as an active tag, a semi-passive tag, a passive tag, or any other suitable type of tag. RFID tag 12 may include any suitable combination of hardware, software, and firmware. Although RFID tag 12 is illustrated and described as having particular components, the present invention contemplates tag 12 having any suitable components, according to particular needs.

RFID tag 12 comprises one or more processing units 300 and one or more memory modules 302. The one or more processing units 300 may include one or more microprocessors, controllers, or any other suitable computing devices or resources. For example, these additional devices or resources may include one or more sensors, one or more transmitters, one or more receivers, one or more transponders, one or more transceivers, and/or any other suitable components. These components may comprise one or more of processing units 300, or the one or more processing units 300 may interact with these components to perform various operations of tag 12. For simplicity, one or more processing units 300 will be referred to hereinafter in the singular.

The one or more memory modules 302 (referred to hereinafter for simplicity in the singular) may take the form of any suitable combination of volatile or non-volatile memory including, without limitation, magnetic media, optical media, random-access memory (RAM), read-only memory (ROM), removable media, or any other suitable memory component.

Memory module 302 may store any suitable information. Memory module 302 may store a copy of the single subscriber identification number 304 shared among the tags in the logical subscriber entity of tag 12. As described above, subscriber identification number 304 may include any suitable identifier for identifying a subscriber for use in accessing WWAN 14. For example, subscriber identification number 304 may include a cellular telephone number, an international mobile subscriber identity (IMSI), or any other suitable identifier.

Memory module 302 may store authentication information 306, which may include additional information used by tag 12 to access or otherwise use WWAN 14. For example, authentication information 306 may include one or more authorization keys for use in authenticating tag 12 to WWAN 14 when tag 12 attempts to access WWAN 14 using subscriber identification number 304. In certain embodiments, authentication information 306 is also shared with other tags 12 in the logical subscriber entity in substantially the same manner as subscriber identification number 304 is shared.

In embodiments in which the token-sharing technique is used for determining which tag 12 is authorized to access WWAN 14, memory module 302 may store an access token 308 when tag 12 is in possession of such a token. Access token 308 may have any suitable format, according to particular needs. Memory module 302 may also store a routing table 310 for determining another tag 12 to which tag 12 should transmit access token 308 when tag 12 has completed its tag session (or when the access token 308 has expired for purposes of tag 12's use). The order of tags 12 in routing table 310 may be determined in any suitable manner.

In embodiments in which a fixed-length session technique is used for determining which tag 12 is authorized to access WWAN 14, memory module 302 may store timeslot information 312. Timeslot information 312 may include an indication of the start time of the corresponding timeslot 202 (e.g., within fixed time period 200) for tag 12, an indication of the duration of the corresponding timeslot 202, and any other suitable information.

Memory module 312 may store tag information 314. Tag information 314 may include a tag ID of tag 12, timing information, collected sensor data, or any other suitable type of data, according to particular needs. For example, tag information 314 may include information to be transmitted by tag 12 when tag 12 is connected to WWAN 14. As another example, tag information 314 may include information that has been received by tag 12 when tag 12 was connected to WWAN 14.

Tag 12 may include one or more antenna 316. Antenna 316 may include any suitable type(s) of antenna according to particular needs. Furthermore, tag 12 may include a combination of different types of antenna 316, if appropriate. Although described as an antenna, the present invention contemplates tag 12 including any suitable component operable to transmit and/or receive signals over WWAN 14.

Tag 12 may include one or more internal clocks 318 (referred to hereinafter for simplicity in the singular). Clock 318 may be operable to run even in a low power state. In certain embodiments, this may allow processing unit 300 of tag 12 to determine if tag 12 should wake up a predetermined amount of time prior to the corresponding unique timeslot for tag 12. Clock 318 may be synchronized to a predetermined time (e.g., GMT).

If appropriate, RFID tag 12 may include one or more power supplies 320 (referred to hereinafter for simplicity in the singular). The inclusion of power supply 320 may depend on the type of RFID tag 12. For example, certain types of tags 12 (e.g., passive RFID tags) typically do not include an internal power supply. As another example, certain types of tags 12 (e.g., semi-active or active RFID tags) may include a power supply.

In operation of an example embodiment of tag 12 (which will be referred to as a particular tag 12), a particular tag 12 shares subscriber identification number 304 for accessing WWAN 14 with one or more other tags 12. Each tag 12 is operable to access WWAN 14 using subscriber identification number 304 at a corresponding unique timeslot 202 for the tag 12, the corresponding unique timeslot 202 for the tag 12 being different than the timeslots 202 at which the other tags 12 can access WWAN 14 using subscriber identification number 304.

Processing unit 300 of the particular tag 12 may cause the particular tag 12 to access WWAN 14 using subscriber identification number 304 to initiate a tag session, the tag session being at the corresponding unique timeslot 202 for the particular tag 12. The corresponding unique timeslot 202 for the particular tag 12 is distinct from timeslots 202 at which the one or more other tags 12 may access WWAN 14 using subscriber identification number 304 to initiate tag sessions. To access WWAN 14, processing unit 300 may cause the particular tag 12 to establish a connection (e.g., link 18) with WWAN 14 using subscriber identification number 304. For example, at the corresponding unique timeslot 202 for the particular tag 12, processing unit 300 is operable to access WWAN 14 using subscriber identification number 304 by initiating a wireless call on WWAN 14 using subscriber identification number 304.

In certain embodiments, processing unit 300 of the particular tag 12 accesses WWAN 14 according to a fixed-length session technique. In certain embodiments, processing unit 300 of the particular tag 12 accesses WWAN 14 according to a variable-length session technique.

Processing unit 300 of the particular tag 12 may communicate tag information 314 during the tag session at the corresponding unique timeslot 202 for the particular tag 12. In a more particular example, processing unit 300 of the particular tag 12 may access tag information 314 stored in memory module 302 of the particular tag 12 and may communicate at least a portion of tag information 314 to an appropriate destination via WWAN 14.

Processing unit 300 of the particular tag 12 may terminate the connection (e.g., link 18) of the particular tag 12 to WWAN 14. For example, processing unit 300 may terminate the wireless call with WWAN 14, the connection may time out (e.g., due to meeting some predefined condition), or the connection may be terminated in any other suitable manner. Processing unit 300 of the particular tag 12 may repeated the above-described operations each time a corresponding timeslot 202 for the particular tag 12 occurs.

In operation of an example embodiment of a particular tag 12 in which a fixed-length session technique is used, the particular tag 12 may store, in memory module 302 for example, timeslot information 312 identifying the corresponding timeslot 202 for the particular tag 12 to conduct a tag session. The duration of the corresponding timeslot 202 for the particular tag 12 is fixed, such that the tag session is fixed. In certain embodiments, tags 12 may remain in a sleep state between instances of their corresponding unique timeslots 202.

Processing unit 300 of particular tag 12 may determine whether it is time to awaken from a sleep state. In certain embodiments, processing unit 300 of the particular tag 12 is operable to wake up the particular tag 12 from the sleep state a predetermined amount of time prior to the pre-assigned timeslot 202 for the particular tag 12. In certain embodiments, the particular tag 12 may use internal clock 318 to determine when its corresponding timeslot 202 is approaching and the predetermined time ahead of the corresponding unique timeslot 202 for the particular tag 12 has arrived (and the particular tag 12 should wake up). The determination of whether it is time to awaken may be made in any suitable manner, according to particular needs. For example, processing unit 300 of the particular tag 12 may make this determination at any suitable interval. As another example, internal clock 318 of the particular tag 12 may trigger an alert, alarm, interrupt or other exception that causes tag 12 to wake up. In this sense, the determination made may not be an explicit determination made by tag 12.

If processing unit 300 determines that it is not time for the particular tag 12 to awaken from the sleep state, then the particular tag 12 may remain in the sleep state, and the method may loop until it is time for the particular tag 12 to wake up (or the particular tag 12's inclusion in the logical subscriber entity is otherwise terminated). If processing unit 300 determines that it is time for the particular tag 12 to wake up from the sleep state, then processing unit 300 (and/or internal clock 318) may cause the particular tag 12 to wake up from the sleep state a predetermined amount of time prior to the pre-assigned timeslot 202 for the particular tag 12.

Processing unit 300 of the particular tag 12 may, after causing the particular tag 12 to wake up and prior to accessing WWAN 14 using subscriber identification number 304, initiate locating of a base station of WWAN 14 and performance of clock synchronization with the base station. In certain embodiments, clock 318 of the particular tag 12 may be synchronized to the network time (e.g., of WWAN 14). The particular tag 12 may listen to the base station signal of the located base station of WWAN 14, and may perform synchronization according to a located signal. In certain embodiments, tags 12 are aware of their time zone and correct their timeslot counters internally.

Once the corresponding timeslot 202 for the particular tag 12 has arrived, the processing unit may cause the particular tag 12 to access WWAN 14 using subscriber identification number 304, as described above, to initiate a tag session during the pre-assigned timeslot 202. Processing unit 300 of the particular tag 12 may cause the particular tag 12 to communicate tag information 314 during the pre-assigned timeslot 202, as described above. For example, processing unit 300 may access a portion or all of tag information 314 in memory module 302 and communicate a portion or all of tag information 314. Processing module may cause the particular tag 12 to terminate its connection (e.g., link 18) to WWAN 14 and cause the particular tag 12 to return to a sleep state.

In operation of an example embodiment of a particular tag 12 in which a variable-length session technique is used, processing unit 300 of the particular tag 12 may receive an access token 308 authorizing the particular tag 12 to access WWAN 14 using subscriber identification number 304 while the particular tag 12 is in possession of access token 308. In certain embodiments, the particular tag 12 may be in a sleep state (e.g., to conserve power), and the receipt of access token 308 may cause the particular tag 12 to awaken from its sleep state. Processing unit 300 of the particular tag 300 may store access token 308 in memory module 302.

Processing unit 300 may cause the particular tag 12 to access WWAN 14 using subscriber identification number 304 to initiate a tag session while the particular tag 12 is in possession of access token 308. The corresponding timeslot 202 for the particular tag 12 in this case may be the time that the particular tag 12 is in possession of access token 308 and is thus authorized to access WWAN 14 using subscriber identification number 304 to initiate a tag session.

Processing unit 300 may cause the particular tag 12 to communicate tag information 314 during the tag session. It should be understood that, for the purposes of this description, communicating tag information 314 may include any suitable combination of transmitting and/or receiving tag information 314.

After termination of the tag session, processing unit 300 may cause the particular tag 12 to communicate access token 308 to another tag 12. The present invention contemplates termination of the tag session for any suitable reason. The determination of the tag 12 to which the particular tag 12 should pass access token 308 may be made in any suitable manner, according to particular needs. In certain embodiments, processing unit 300 accesses routing table 310 to determine the tag 12 to which access token 308 should be transmitted. For example, processing unit 300 of the particular tag 12 may access routing table 310 and determine another tag 12 to which access token 308 should be passed based on the information in routing table 310.

Although a single iteration has been described, it will be understood that the particular tag 12 may wait to receive access token 308 again to communicate tag information. Once the particular tag 12 receives access token 308 again, processing unit 300 may repeat at least a portion of the steps described with reference to FIG. 6. In certain embodiments, the particular tag 12 may enter a sleep state for at least a portion of the time that it is waiting for access token 308.

As described above, the present invention contemplates tags 12 being operable to share subscriber identification number 304 according to both the fixed-length and variable techniques, and being able to make such a determination in real time. For example, tags 12 may be preprogrammed to be capable of operating using either of the fixed-length or variable-length session techniques, and may determine which is more appropriate to use in real time.

As a particular example, processing units 300 of tags 12 of a logical subscriber entity may determine whether the tags 12 can communicate directly with one another, in a wireless mesh network for instance. If processing units 300 of tags 12 determine that the tags 12 can communicate directly with one another, then processing units 300 of tags 12 may initiate tag sessions according to a variable-length session technique. If processing units 300 of tags 12 determine that the tags 12 are not able to communicate directly with one another, then processing units 300 of tags 12 may initiate tag sessions according to a fixed-length session technique.

Figure 4:
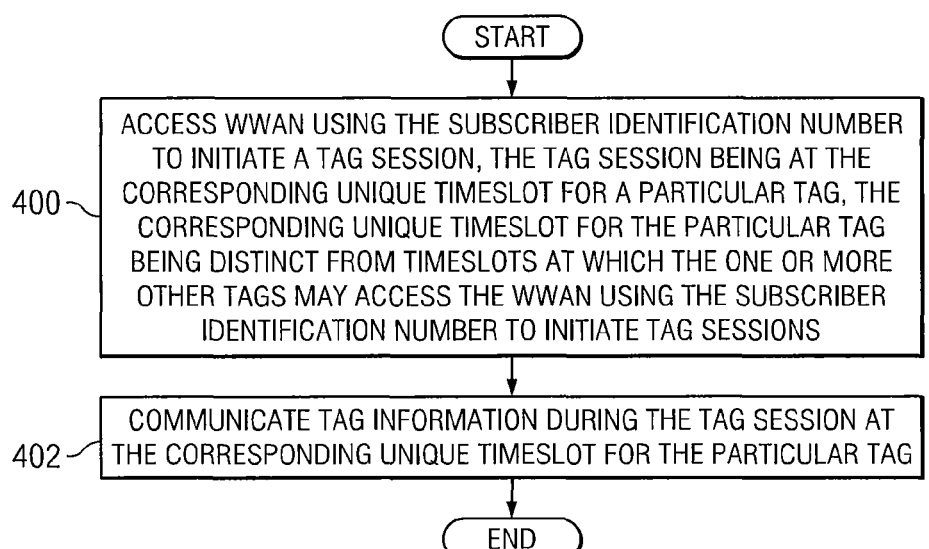
FIG. 4 illustrates an example method for a multiple RFID tag WWAN protocol, according to certain embodiments of the present invention.

FIG. 4 illustrates an example method for a multiple RFID tag WWAN protocol, according to certain embodiments of the present invention. For purposes of the example method described with reference to FIG. 4, it will be assumed that a particular tag 12 shares a subscriber identification number 304 for accessing WWAN 14 with one or more other tags 12. Each tag 12 may be operable to access the WWAN 14 using subscriber identification number 304 at a corresponding unique timeslot 202 for the tag 12, the corresponding unique timeslot 202 for the tag 12 being different than the timeslots 202 at which the other tags 12 can access WWAN 14 using subscriber identification number 304.

At step 400, the particular tag 12 may access WWAN 14 using subscriber identification number 304 to initiate a tag session, the tag session being at the corresponding unique timeslot 202 for the particular tag 12, the corresponding unique timeslot 202 for the particular tag 12 being distinct from timeslots 202 at which the one or more other tags 12 may access WWAN 14 using subscriber identification number 304 to initiate tag sessions. For example, processing unit 300 of the particular tag 12 may be operable to initiate or otherwise perform the accessing of WWAN 14. To access WWAN 14, the particular tag 12 may establish a connection (e.g., link 18) with WWAN 14. In certain embodiments, at the corresponding unique timeslot 202 for the particular tag 12, processing unit 300 is operable to access WWAN 14 using subscriber identification number 304 by initiating a wireless call on WWAN 14 using subscriber identification number 304.

In certain embodiments, the particular tag 12 may access WWAN 14 according to a fixed-length session technique. FIG. 5, described below, illustrates an example method for accessing WWAN 14 according to a fixed-length session technique. In certain embodiments, the particular tag 12 may access WWAN 14 according to a variable-length session technique. FIG. 6, described below, illustrates an example method for accessing WWAN 14 according to a variable-length session technique.

At step 402, the particular tag 12 may communicate tag information 314 during the tag session at the corresponding unique timeslot 202 for the particular tag 12. For example, processing unit 300 of the particular tag 12 may communicate tag information 314. In a more particular example, processing unit 300 of the particular tag 12 may access tag information 314 stored in memory module 302 of the particular tag 12 and may communicate at least a portion of tag information 314 to an appropriate destination via WWAN 14. In certain embodiments, the particular tag 12 may communicate tag information 314 to one or more backend systems 16 via WWAN 14. It should be understood that, for the purposes of this description, communicating tag information may include any suitable combination of transmitting and/or receiving tag information 314.

At step 404, the particular tag 12 may terminate its connection (e.g., link 18) to WWAN 14. For example, processing unit 300 of the particular tag 12 may terminate the wireless call with WWAN 14, the connection may time out (e.g., due to meeting some predefined condition), or the connection may be terminated in any other suitable manner.

The method of FIG. 4 may be repeated each time a corresponding timeslot 202 for the tag arises. For example, tags 12 may repeatedly cycle through fixed time frame 200. Each tag 12 may divide its payload (i.e., tag information 314) over a number of corresponding timeslots 202 (and tag sessions), if appropriate. For example, if the corresponding timeslot 202 for a tag 12 is insufficient for the tag 12 to communicate its desired tag information 314, the tag 12 may transmit the remainder of the desired tag information 314 over one or more next corresponding timeslots 202 in one or more future fixed time frames 200.

FIG. 5 illustrates an example method for accessing WWAN 14 according to a fixed-length session technique. As described above, tags 12 may store, in memory module 302 for example, timeslot information 312 identifying the corresponding timeslot 202 for the tag 12 to conduct a tag session. The corresponding timeslot 202 for the tag 12 may have a predetermined start time and duration, and may be pre-assigned to the tag 12 for the tag 12 to conduct the tag session. In certain embodiments, the duration of the corresponding timeslot 202 for the tag 12 is fixed, such that the tag session is fixed. The corresponding unique timeslot 202 for the tag 12 may be one of a plurality of timeslots 202 within a fixed time period 200, each of the tag 12 and the one or more other tags 12 having a corresponding assigned timeslot 202. It should be noted that while in this embodiment the durations of timeslots 202 are pre-assigned, the durations that are pre-assigned to timeslots 202 may vary, if appropriate. For example, it may be determined that certain tags 12 should be pre-assigned a longer timeslot 202 than other tags 12. In certain embodiments, tags 12 may remain in a sleep state between instances of their corresponding unique timeslots 202.

At step 500, a particular tag 12 determines whether it is time to awaken from a sleep state. For example, processing unit 300 of a particular tag 12 may determine whether it is time to awaken from the sleep state. In certain embodiments, each tag 12 of system 10 may be configured to wake up from the sleep state a predetermined amount of time prior to the pre-assigned timeslot 202 for the tag 12. For example, processing unit 300 of the particular tag 12 may wake up a predetermined amount of time prior to the pre-assigned timeslot 202 for the particular tag 12. In certain embodiments, the particular tag 12 may use internal clock 318 to determine when its corresponding timeslot 202 is approaching and the predetermined time ahead of the corresponding unique timeslot 202 for the particular tag 12 has arrived (and the particular tag 12 should wake up).

The determination at step 500 may be made in any suitable manner, according to particular needs. For example, processing unit 300 of the particular tag 12 may make this determination at any suitable interval. As another example, internal clock 318 of the particular tag 12 may trigger an alert, alarm, interrupt or other exception that causes tag 12 to wake up. In this sense, the determination made at step 500 may not be an explicit determination made by tag 12.

If it determined at step 500 that it is not time for the particular tag 12 to awaken from the sleep state, then the particular tag 12 may remain in the sleep state, and the method may loop until it is time for the particular tag 12 to wake up (or the particular tag 12's inclusion in the logical subscriber entity is otherwise terminated).

If it is determined at step 500 that it is time for the particular tag 12 to wake up from the sleep state, then at step 502, the particular tag 12 may wake up from the sleep state a predetermined amount of time prior to the pre-assigned timeslot 202 for the particular tag 12.

At step 504, the particular tag 12 may, after waking up and prior to accessing WWAN 14 using subscriber identification number 304, locate a base station of WWAN 14 and perform clock synchronization with the base station. Processing unit 300 of the particular tag 12 may perform these operations. In certain embodiments, clock 318 of the particular tag 12 may be synchronized to the network time (e.g., of WWAN 14). The particular tag 12 may listen to the base station signal of the located base station of WWAN 14, and may perform synchronization according to a located signal.

At step 506, once the corresponding timeslot 202 for the particular tag 12 has arrived, the particular tag 12 may access WWAN 14 using subscriber identification number 304, as described above with reference to step 400 of FIG. 4, to initiate a tag session during the pre-assigned timeslot 202. At step 508, the particular tag 12 may communicate tag information 314 during the pre-assigned timeslot 202 as described above with reference to step 402 of FIG. 4. In certain embodiments, tag information 314 communicated during the tag session for the tag comprises one or more fixed-length data packets. This may facilitate keeping the sizes of timeslots 202 constant, if appropriate. At step 510, the particular tag 12 may terminate its connection (e.g., link 18) to WWAN 14. At step 512, the particular tag 12 may return to a sleep state.

FIG. 6 illustrates an example method for accessing WWAN 14 according to a variable-length session technique. At step 600, a particular tag 12 may receive an access token 308 authorizing the particular tag 12 to access WWAN 14 using subscriber identification number 304 while the particular tag 12 is in possession of access token 308. For example, processing unit 300 of the particular tag 12 may receive access token 308. Access token 308 may be received from any suitable source. As a first example, the particular tag 12 may be preprogrammed to be the first tag 12 in a logical subscriber entity to communicate, and thus may be initialized as the first tag 12 in the logical subscriber entity to possess access token 308. As another example, the particular tag 12 may receive access token 308 from another tag 12 in the logical subscriber entity. In certain embodiments, the particular tag 12 may be in a sleep state (e.g., to conserve power), and the receipt of access token 308 may cause the particular tag 12 to awaken from its sleep state. At step 602, the particular tag 12 may store access token 308. For example, processing unit 300 of the particular tag 12 may store access token 308 in memory module 302.

At step 604, the particular tag 12 may access WWAN 14 using subscriber identification number 304 to initiate a tag session while the particular tag 12 is in possession of access token 308. For example, the particular tag 12 may access the WWAN 14 as described above with reference to FIG. 4 at step 400. The corresponding timeslot 202 for the particular tag 12 in this case may be the time that the particular tag 12 is in possession of access token 308 and is thus authorized to access WWAN 14 using subscriber identification number 304 to initiate a tag session.

At step 606, the particular tag 12 may communicate tag information 314 during the tag session. For example, processing unit 300 of the particular tag 12 may communicate the tag information 314 during the tag session. The particular tag 12 may communicate tag information 314 as described above with reference to FIG. 4 at step 402. It should be understood that, for the purposes of this description, communicating tag information 314 may include any suitable combination of transmitting and/or receiving tag information 314.

At step 608, after termination of the tag session, the particular tag 12 may communicate access token 308 to another tag 12. The present invention contemplates termination of the tag session for any suitable reason. As a first example, the tag session may last as long as the particular tag 12 has tag information 314 to communicate. As a second example, access token 308 may authorize its possessor to communicate a particular number of bits of data (or the tag 12 may otherwise be preset to communicate only a certain number of bits).

In certain embodiments, access token 308 may be valid for use by the particular tag 12 for a predetermined time period, after which the particular tag 12 may no longer be authorized to access WWAN 14 using subscriber identification number 304. The time limit for access token 308 may be implemented in any suitable manner, according to particular needs. As just one example, access token 308 may include an internal timer. After access token 308 expires, the particular tag 12 may be forced to terminate its connection to WWAN 14 and to communicate access token 308 to another tag 12. In such embodiments, it is possible that the particular tag 12 tag may not complete communication of tag information 314 prior to termination of the tag session. In such a scenario, the particular tag 12 may resume communication of tag information 314 when the particular tag 12 receives access token 308 again in the future.

The determination of the tag 12 to which the particular tag 12 should pass access token 308 may be made in any suitable manner, according to particular needs. In certain embodiments, processing unit 300 accesses routing table 310 to determine the tag 12 to which access token 308 should be transmitted. For example, processing unit 300 of the particular tag 12 may access routing table 310 and determine another tag 12 to which access token 308 should be passed based on the information in routing table 310.

According to the variable-length session technique described with reference to FIG. 6, it may be possible for the durations of tag sessions to vary from tag 12 to tag 12. For example, a first tag 12 may communicate a relatively small amount of tag information 314 and may quickly pass access token 308 to the next tag 12. However, the next tag 12 may have a relatively large amount of tag information 314 to communicate, which may result in the tag holding access token 308 for a longer period of time and thereby have a tag session of a longer duration.

Although a single iteration has been described, it will be understood that the particular tag 12 may wait to receive access token 308 again to communicate tag information. Once the particular tag 12 receives access token 308 again, it may repeat at least a portion of the steps described with reference to FIG. 6. In certain embodiments, the particular tag 12 may enter a sleep state for at least a portion of the time that it is waiting for access token 308.

As described above, the present invention contemplates tags 12 being operable to share subscriber identification number 304 according to both the fixed-length and variable techniques, and being able to make such a determination in real time. For example, tags 12 may be preprogrammed to be capable of operating using either of the fixed-length or variable-length session techniques, and may determine which is more appropriate to use in real time.

As a particular example, tags 12 of a logical subscriber entity may determine whether the tags 12 can communicate directly with one another, in a wireless mesh network for instance. If it is determined the tags 12 can communicate directly with one another, then tags 12 may initiate tag sessions according to a variable-length session technique. If it is determined that the tags 12 are not able to communicate directly with one another, then tags 12 may initiate tag sessions according to a fixed-length session technique.

Although particular methods have been described with reference to FIGS. 4-6, the present invention contemplates any suitable methods in accordance with the present invention. Thus, certain of the steps described with reference to FIGS. 4-6 may take place substantially simultaneously and/or in different orders than as shown and described. Moreover, components of system 10 and tag 12 may use methods with additional steps, fewer steps, and/or different steps, so long as the methods remain appropriate.

Example Implementation with GSM

FIGS. 7 through 20 illustrate a particular example of certain embodiments of the present invention in which aspects of the present invention are implemented in a GSM network. The example GSM implementation is provided for example purposes only and should not be used to limit the present invention. Moreover, the details provided below provide just one example of how the present invention may be implemented in a GSM network. Although this particular example is described using a GSM WWAN, as described above, one of ordinary skill in the art will understand that the present invention contemplates using any suitable WWAN technology, such as CDMA, Wi-MAX, or any other suitable WWAN technology.

Example GSM WWAN Architecture

Figure 7:
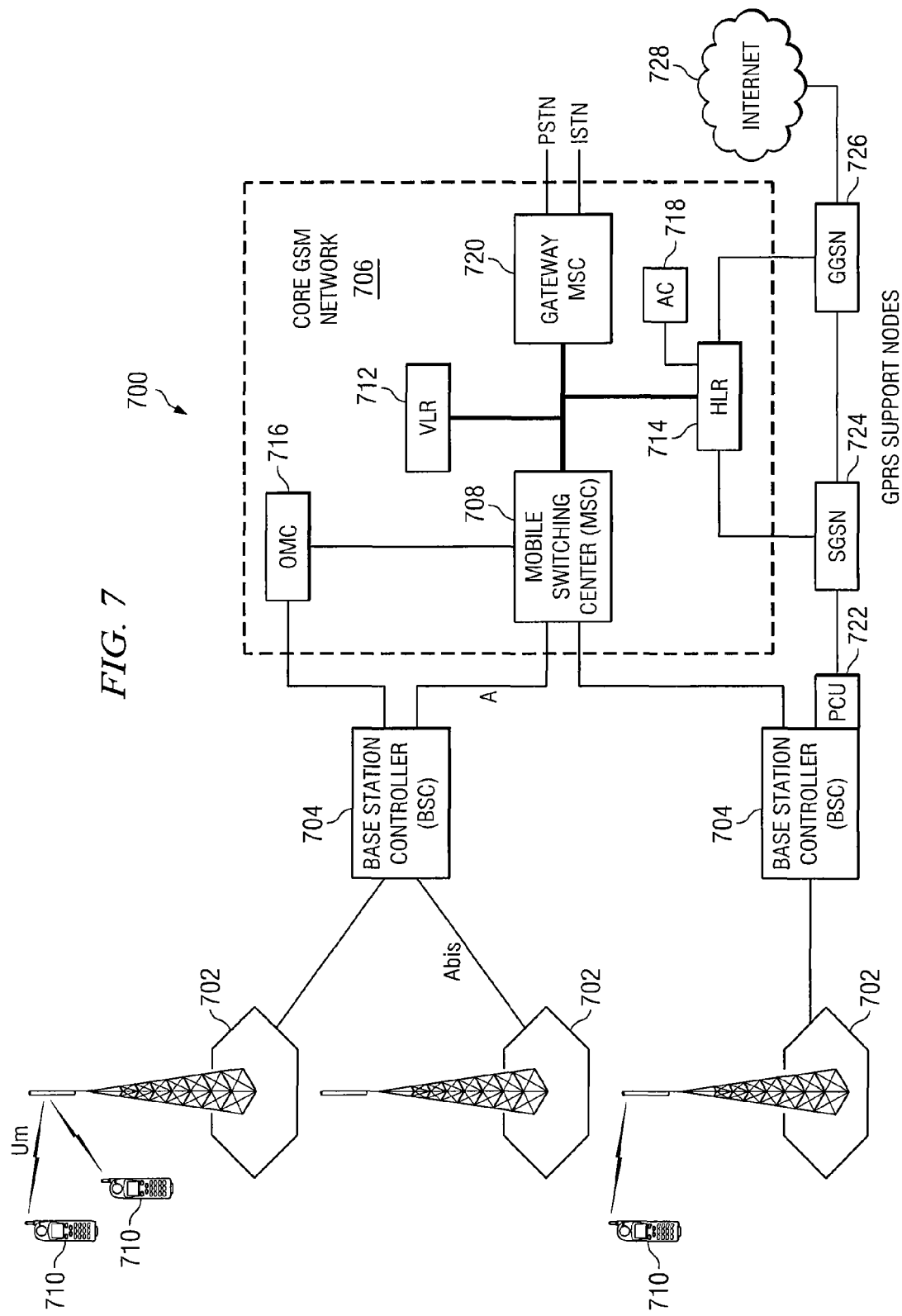
FIG. 7 illustrates an example architecture of an example GSM network, which may comprise all or a portion of the WWAN described above with reference to FIG. 1.

FIG. 7 illustrates an example architecture of an example GSM network 700, which may comprise all or a portion of WWAN 14 described above with reference to FIG. 1. GSM network 700 comprises one or more base stations 702, one or more base station controllers (BSCs) 704, and a core 706. One or more mobile units 710, which for purposes of the present invention include RFID tags 12, may communicate using GSM network 700.

BSCs 704 may be distributed throughout a geographic area. Each BSC 704 may be operable to communicate with a base station 702. Each base station 702 forms a cellular area of coverage and may communicate with multiple mobile units 710 (e.g., tags 12 and possibly other types of mobile units 710) within range using an air-interface protocol (e.g., Um). In certain embodiments, the range of a base station 702 is approximately twenty miles per cell; however, the present invention contemplates any suitable range. Those of ordinary skill in the art will appreciate that one or more base stations 702 and one or more BSCs 704 may be combined in any suitable manner, if appropriate, and may collectively be considered a base station subsystem.

Core 706 may include one or more mobile switching centers (MSCs) 708. BSCs 704 may be connected to one or more corresponding MSCs 708. An MSC 708 may be operable to switch calls from other switching centers, possibly including those belonging to other service providers (which may facilitate roaming). Each MSC 708 may also be connected to a visitor location registry (VLR) 712 and a home location registry (HLR) 714 that store registration and certification information for each mobile unit 710 (e.g., tag 12). The VLR typically stores roaming subscriber information for subsequent faster authentication and billing reconciliation. Other centers, such as the operations management center (OMC) 716 and accounting centers (ACs) 718 that facilitate overall WWAN operations and management may also be present in GSM network 700. MSC 708 may be connected to a gateway 720 that translates packets to formats suitable for communication to other networks, such as other standard analog or digital telephone networks.

Additional support nodes (e.g., PCU 722, SGSN 724, and GGSN 726) may be included or otherwise added to GSM network 700. In certain embodiments, these support nodes may be used to provide general packet radio service (GPRS), and may provide data access directly via Internet 728.

Figure 8:
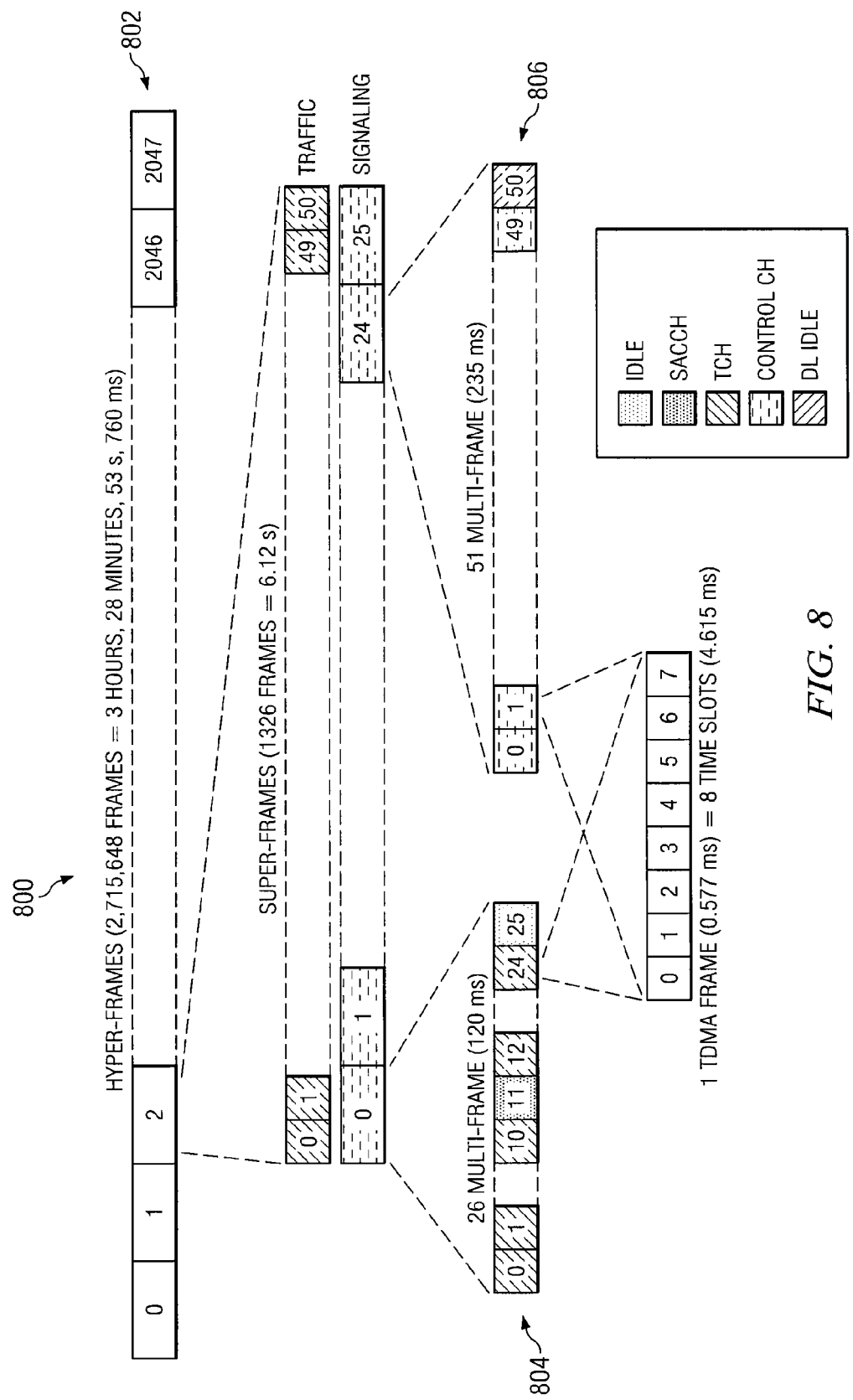
FIG. 8 illustrates an example channel architecture for a GSM network.

FIG. 8 illustrates an example channel architecture 800 for GSM network 700. This particular channel architecture 800 is provided for example purposes only and is not intended to limit the present invention. GSM is typically based on a repeating hierarchical time division multiple access (TDMA) frame structure. In one example, the TDMA frame structure comprises 2048 hyper-frames 802. These 2048 hyper-frames 802 comprise 2,715,648 frames equaling 3 hours, 28 minutes, 53 seconds, and 760 milliseconds. In this example, each of the 2048 hyper-frames 802 includes either 26 signaling super-frames 804 or 51 traffic super-frames 806 that repeat every approximately 6.12 seconds. Mobile unit 610 (e.g., tag 12) listens to signaling super-frames 804 for information about GSM network 700, as well as to synchronize, register, and exchange control information. Mobile unit 610 (e.g., tag 12) may switch to traffic super-frames 806 for data exchanges (e.g., communication of tag information 714). In certain embodiments, this switch may occur after mobile unit 610 (e.g., tag 12) exchanges control and registration data. Both signaling and traffic frames 804 and 806 may be synchronized by base station 702 and may be transmitted simultaneously.

Figure 9:
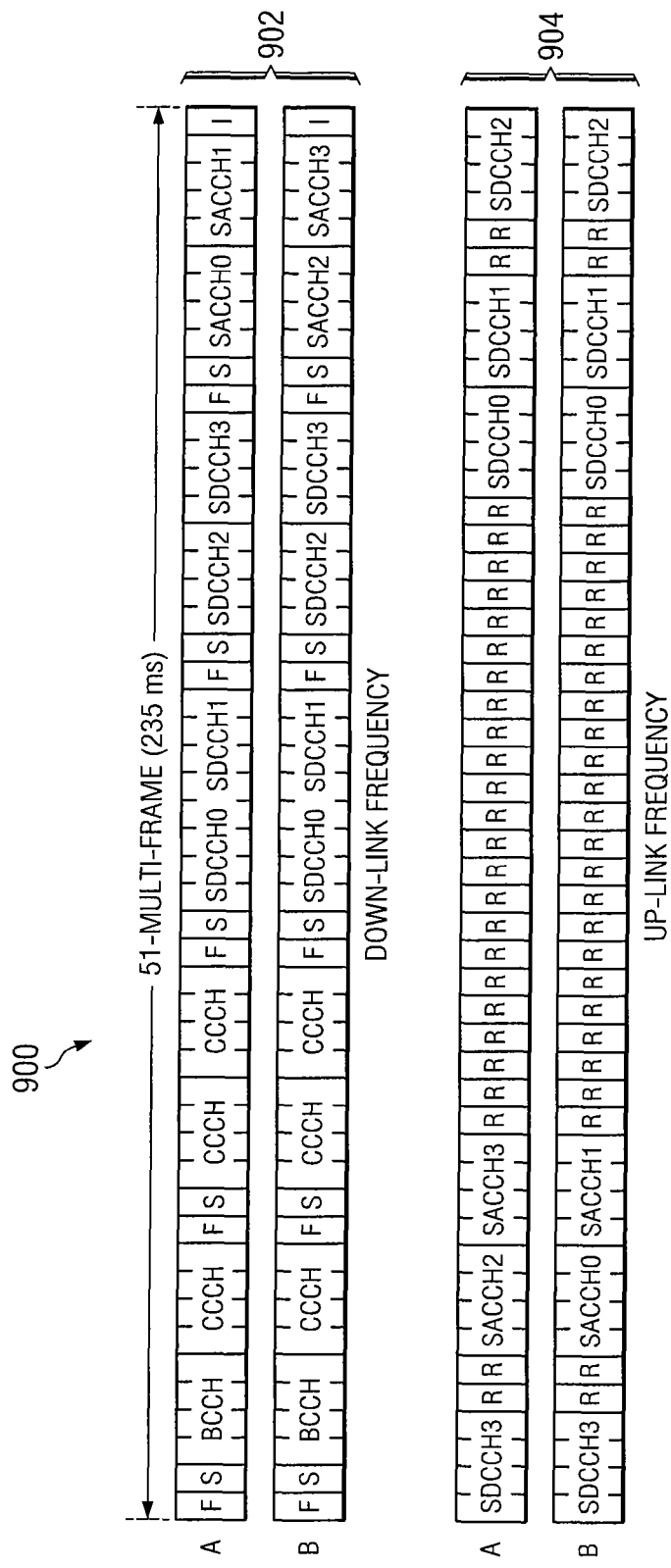
FIG. 9 illustrates an example organization of 51 multi-frames of a signaling super-frame.

FIG. 9 illustrates an example organization of 51 multi-frames 900 of a signaling super-frame 804. In certain embodiments, each of the 26 signaling super-frames 804 comprises one of two types of 51 multi-frames 900, which may be referred to as "A" and "B" multi-frames 900. The 51-multi-frame down-link channels 902 may also be synchronized with up-link channels 904 that mobile unit 610 (e.g., tag 12) uses to send back commands and data corresponding to those commands and data received from the down-link channels 902.

Example State Machine

In certain embodiments, the tag communications process may comprise the following. This state machine is provided for example purposes only.

Figure 18:
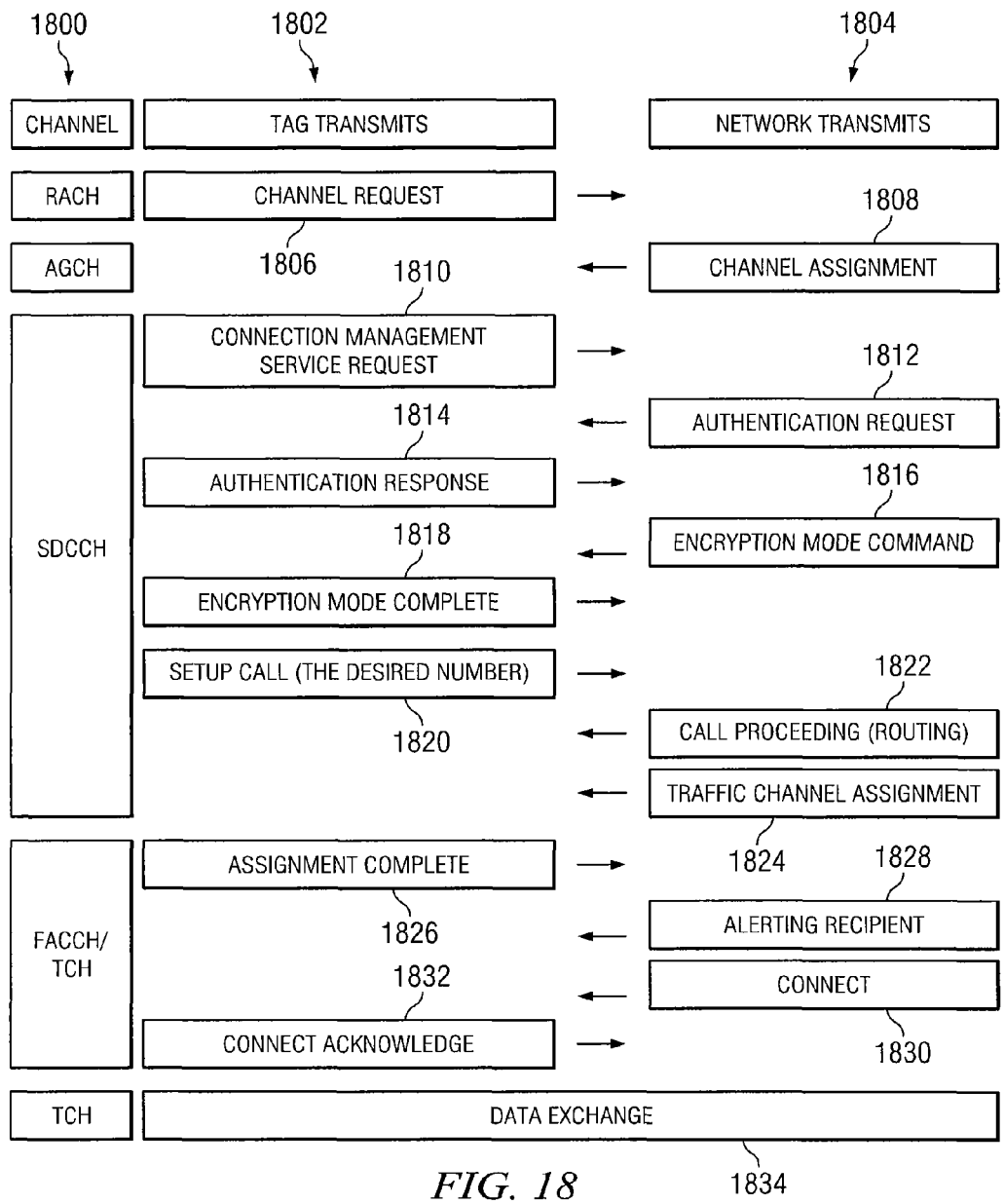
FIG. 18 illustrates an example process for transmitting data from mobile units (e.g., tags), according to certain embodiments of the present invention.
Figure 20:
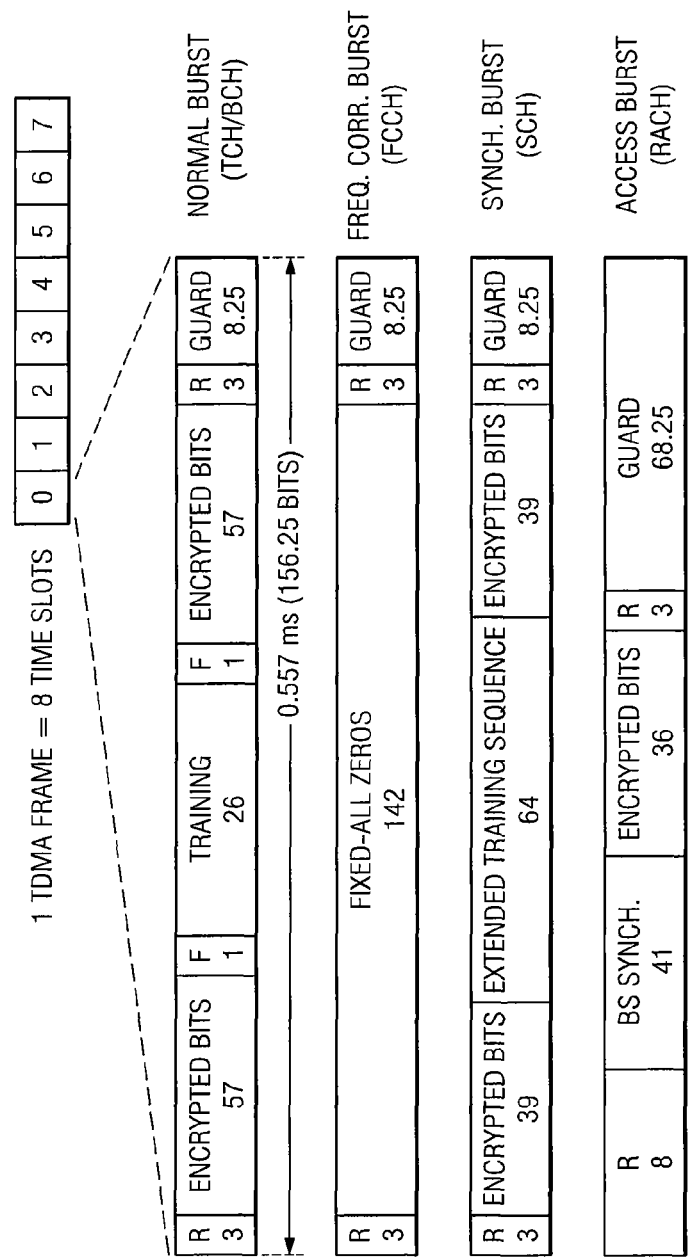
FIG. 20 illustrates an example of different TDMA frame formats, according to certain embodiments of the present invention.

1) Mobile unit 610 (e.g., tag 12) awakens and listens for the frequency correction and synchronization channels.
   a. The wake-up periodicity may be pre-determined based on application constraints. For example, a one hour period may allow each tag 12 in the logical subscriber identity to wake-up and communicate hourly.
   b. The local oscillator timing may be adjusted based on the data bits received from the frequency correction channel (FCCH). FIG. 20, described in more detail below, provides an example summary of TDMA frame formats. The example frame format illustrated in FIG. 18 is an example of the format for the FCCH.
   c. The synchronization channel (SCH) may be decoded and the basic network information (e.g., ID), the timeslot number in the hyper-frame, and the current bit position in the present timeslot may be determined. This information may be determined from decoding 25-bits of the SCH, as described more fully below with reference to FIG. 12.
   d. This step 1 may occur within the first 51-multi-frame or equivalently within 235 ms.
2) Mobile unit 610 (e.g., tag 12) may listen for the broadcast control channel (BCCH) within the present 51-multi-frame 900 or wait for the next 51-multi-frame 900 if the BCCH was missed.
   a. Mobile unit 610 (e.g., tag 12) may decode information from the BCCH. The information contained within the BCCH is stored in 184 bits, as described more fully below with reference to FIG. 14. This information may include the network standard time.
3) Mobile unit 610 (e.g., tag 12) may adjust its internal clock to facilitate an accurate countdown to the mobile unit 610's (e.g., tag 12's) unique timeslot. Timeslot durations for mobile units 610 (e.g., tags 12) may be synchronized with the clock of the associated base station 702.
   a. Mobile unit 610 (e.g., tag 12) may remain synchronized to base station 702 and may choose to implement a mild power conservation mode whereby mobile unit 610 (e.g., tag 12) wakes up approximately each 51-multi-frame 900 to re-synchronize and check its current time with respect to the time that mobile unit 610 (e.g., tag 12) needs to send its data.
   b. The BCCH decoding process may add another 235 ms to the process.
4) Mobile unit 610 (e.g., tag 12) may send out a RACH burst once the assigned session and timeslot within that session is reached.
   a. Mobile unit 610 (e.g., tag 12) may start the channel request, authentication, and association process with the present base station 702. The RACH burst may experience collisions and re-transmission. An example format for the RACH burst is described more fully below with reference to FIG. 16.
   b. This process may span multiple timeslots within a 51-multi-frame 900 depending on network congestion.
   c. It may be appropriate to assume at least 2×235 ms of time to successfully communicate a RACH.
5) Mobile unit 610 (e.g., tag 12) may receive a channel assignment on the AGCH channel.
   a. The assigned channel may be located within one of the A or B 51-multi-frame channels 900. Mobile unit 610 (e.g., tag 12) may decode 184 bits to determine the setup information for mobile unit 610 (e.g., tag 12). The encoding for this channel may be similar to the BCCH.
   b. It may take approximately 2×235 ms to receive one of the AGCHs.
6) Mobile unit 610 (e.g., tag 12) may send a location update request.
   a. Mobile unit 610 (e.g., tag 12) may use one of the 51-multi-frame 900 SDCCH channels in one of the A/B frames.
   b. This may take approximately 2×235 ms.
7) Mobile unit 610 (e.g., tag 12) may receive an authentication request on one of the A/B 51-multi-frames 900 SDCCH. This may take approximately 2×235 ms.
8) Mobile unit 610 (e.g., tag 12) may send an authentication response on one of the A/B 51-multi-frames 900 SDCCH. This may take approximately 2×235 ms.
9) Mobile unit 610 (e.g., tag 12) may receive a temporary ID (e.g., TMSI) on one of the A/B 51-multi-frames 900 SDCCH. This may take approximately 2×235 ms.
10) Mobile unit 610 (e.g., tag 12) may acknowledge the temporary ID on one of the A/B 51-multi-frames 900 SDCCH. This may take approximately 2×235 ms.
11) Mobile unit 610 (e.g., tag 12) may receive a channel release on one of the A/B 51-multi-frames 900 SDCCH This may take approximately 2×235 ms.

The above steps provide a summary of the overall mobile unit 610 (e.g., tag 12) registration process, according to certain embodiments of the present invention.

To transmit data (e.g., tag information), the process may be as follows:
1) Mobile unit 610 (e.g., tag 12) may hop to the assigned traffic channel (TCH).
2) Mobile unit 610 (e.g., tag 12) may transmit data (e.g., tag information).
   a. In certain embodiments, approximately 57×2 bits may be transmitted in each TDMA frame, as shown in the traffic (TCH) frame of FIG. 18.
   b. In certain embodiments, at least one TDMA frame per 26-multi-frame (120 ms) of data exchange may be allowed for the active logical subscriber identity member tag 12. If a greater amount of data per tag session exchange is desired, then the number of 26-multi-frames 804 may be increased. A count of 120 ms may be used for each frame of 2×57 bits.
3) Mobile unit 610 (e.g., tag 12) may terminate the call. Call termination may occur in a control channel assigned to 26-multi-frame 804. Therefore, at least one additional 26-multi-frame time may be used for call termination in a GSM system.

Channel Access Timing

Figure 10:
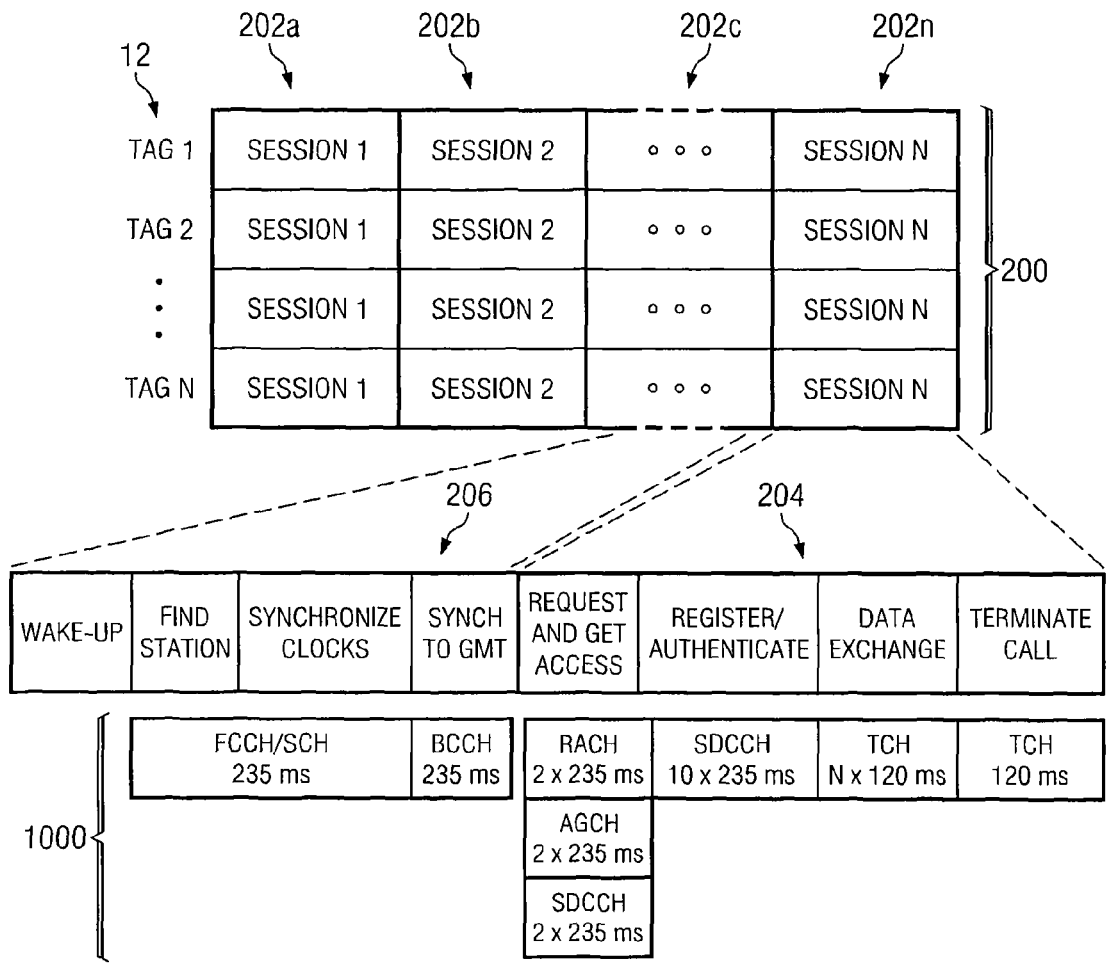
FIG. 10 illustrates example approximate timing for channel access and transmission of data (e.g., tag information)

FIG. 10 illustrates example approximate timing 1000 for channel access and transmission of data (e.g., tag information). FIG. 10 is substantially similar to FIG. 2, described above; however, FIG. 10 provides example timing 1000 for a GSM network, such as GSM network 700.

In the illustrated example, it can typically take approximately 470 milliseconds to locate a base station 702 and synchronize channel access timing. In certain embodiments, at least approximately 235 milliseconds (a GSM 51 multi-frame 900) typically separate each corresponding unique timeslot 202 (and tag session). In addition, it will typically take approximately 3.76 seconds for tag 510 to gain access, register, and authenticate to GSM network 700. It may take another 440 milliseconds to transmit 114 bits of data (e.g., tag information). Therefore, in certain embodiments, it may take approximately 4.67 seconds for a tag 12 to send 114 bits of data (e.g., tag information) across GSM network 700. It could take even longer, depending on network availability. In certain embodiments, therefore, the session time may be longer than 5 seconds but less than a maximum time-out period that may be pre-determined for a given application (e.g., 10 seconds). Under these assumptions, approximately 360 tags 12 can share a subscriber identification number and access GSM network 700 each hour. Each tag 12 may transmit 114 bits at each opportunity in this example. The number of tags 12 in a logical subscriber entity, the length of timeslots, and the length of the fixed time period 200 may all play a role in the frequency with which a tag 12 may access GSM network 700.

Channel Glossary

Figure 11:
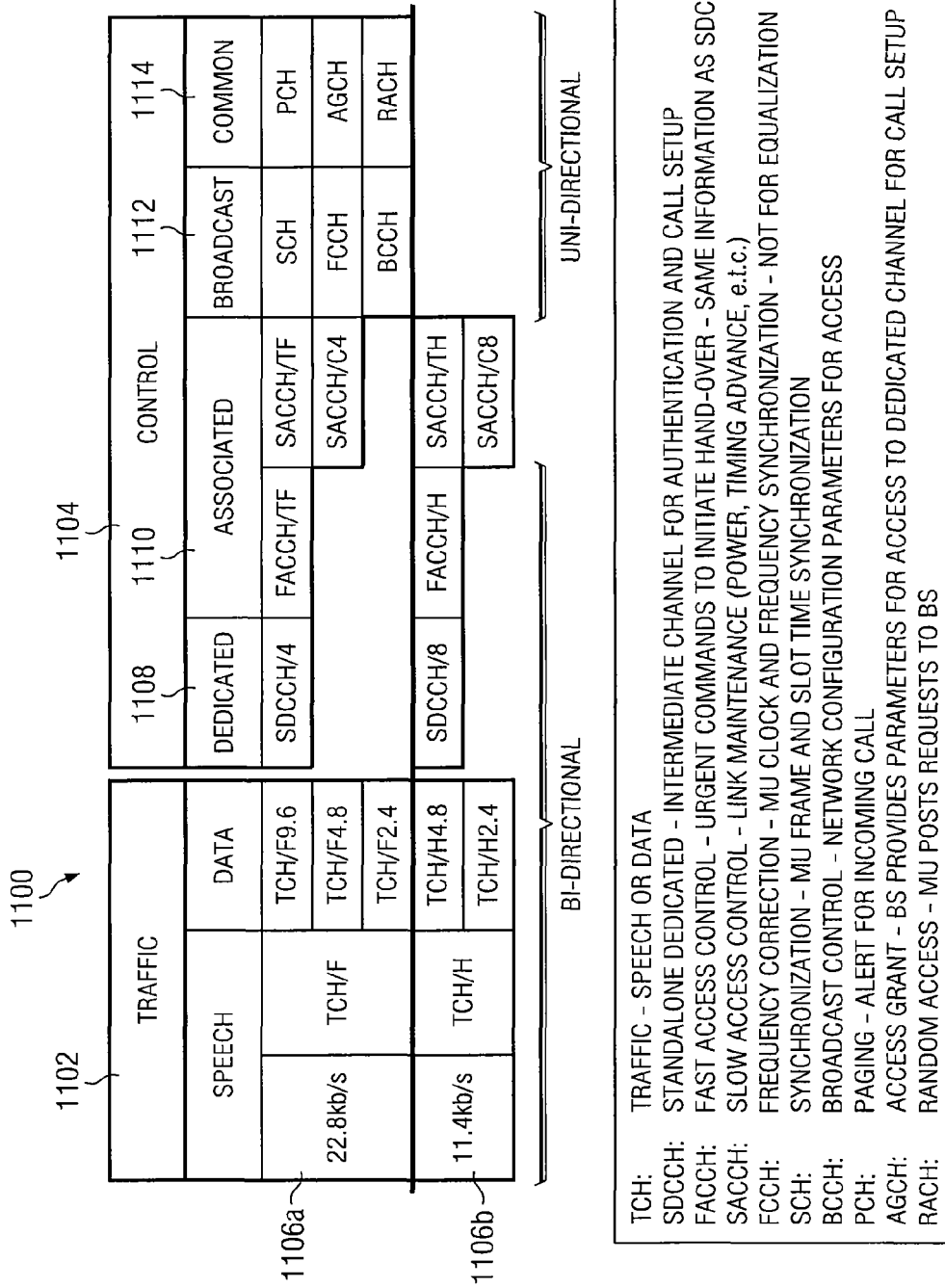
FIG. 11 illustrates an example GSM channel glossary, according to certain embodiments of the present invention.

FIG. 11 illustrates an example GSM channel glossary 1100, according to certain embodiments of the present invention. In certain embodiments, GSM channels may be classified as either a traffic channel 1102 (i.e., for transmitting data other than control signals/data) or control channels 1104 (i.e., for transmitting control signals/data).

Traffic channels 1102 may assume different data rates 1106 as shown in FIG. 11, depending on the network configuration. For example, data rate 1106*a* is 22.8 kb/s, and data rate 1106*b* is 11.4 kb/s. These data rates are provided as examples only.

In certain embodiments, GSM control channels 1104 may be classified in one of four categories: dedicated control channels 1108, associated control channels 1110, broadcast control channels 1112, and common control channels 1114. Dedicated control channels 1108 may be assigned to each mobile unit 710 (e.g., tag 12) requesting access to GSM network 700. Associated control channels 1110 may be used on the fly by multiple mobile units 710 (e.g., tags 12) for service maintenance or fast network changes (e.g., base station roaming of base stations 702). Broadcast control channels 1112 may be "lighthouse beacon" channels that allow mobile units 710 (e.g., tags 12) to find and synchronize to a base station 702. Common control channels 1114 may be used by GSM networks for requesting access or listening for incoming calls.

Synchronization Channel Encoding

Figure 12:
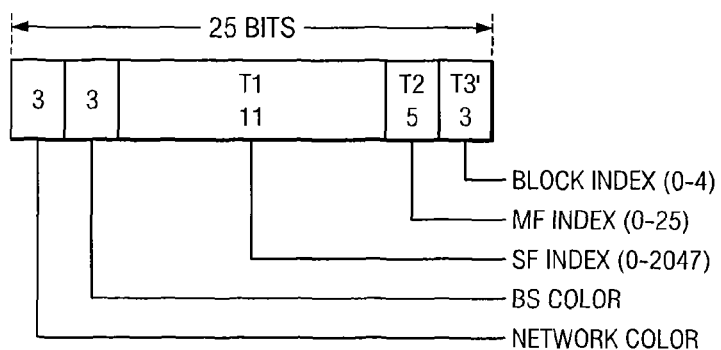
FIG. 12 illustrates an example encoding of the synchronization channel (SCH), according to certain embodiments of the present invention.

FIG. 12 illustrates an example encoding of the SCH, according to certain embodiments of the present invention. In the illustrated example, the SCH comprises 25 bits.

Figure 13:
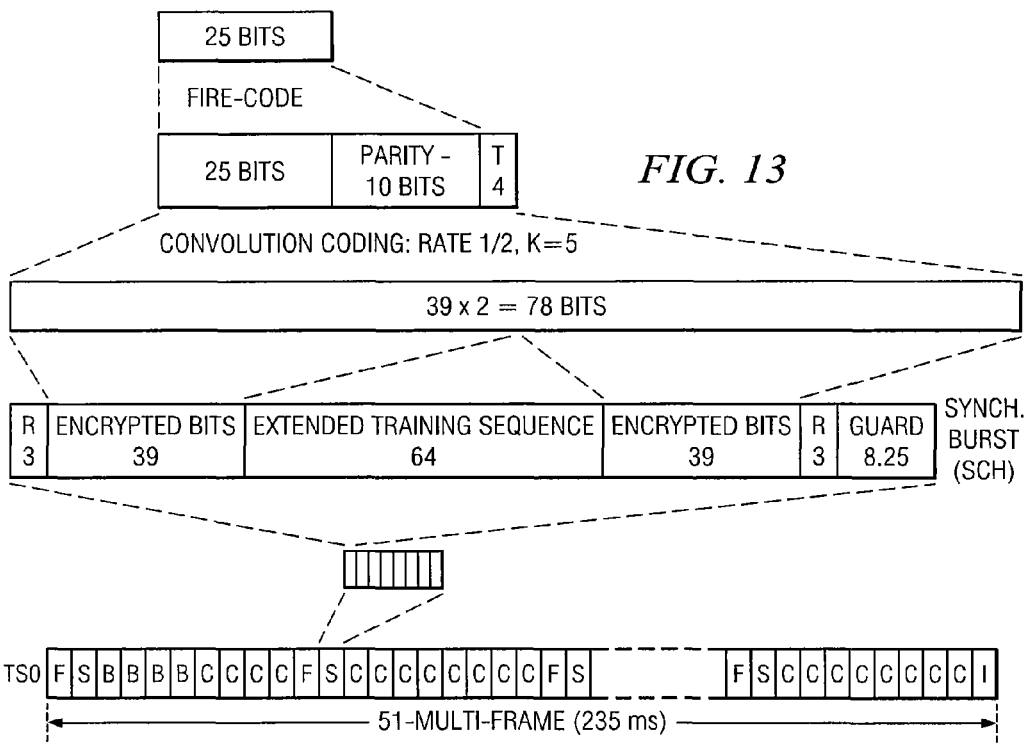
FIG. 13 illustrates an example encoding of synchronization bits into a TDMA synchronization channel (SCH) frame, according to certain embodiments of the present invention.

FIG. 13 illustrates an example encoding of synchronization bits into a TDMA SCH frame, according to certain embodiments of the present invention.

Control Channel Encoding

Figure 14:
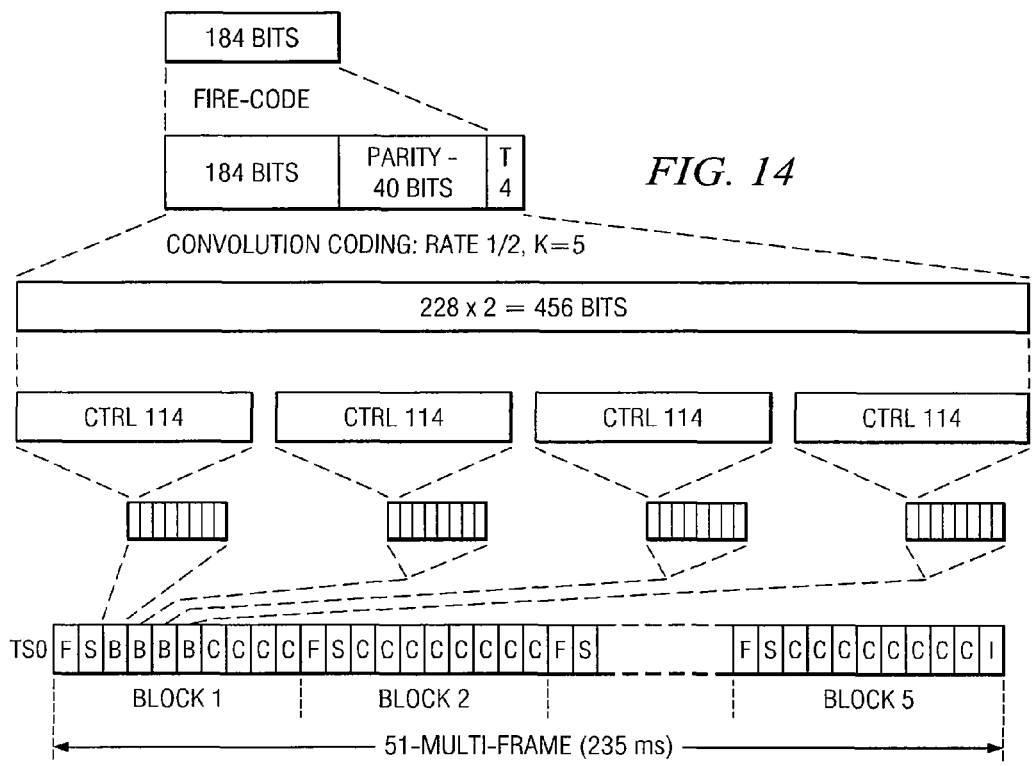
FIG. 14 illustrates an example decoding of BCCH bits, according to certain embodiments of the present invention.

FIG. 14 illustrates an example decoding of BCCH bits, according to certain embodiments of the present invention.

Request Channel Encoding

Figure 15:
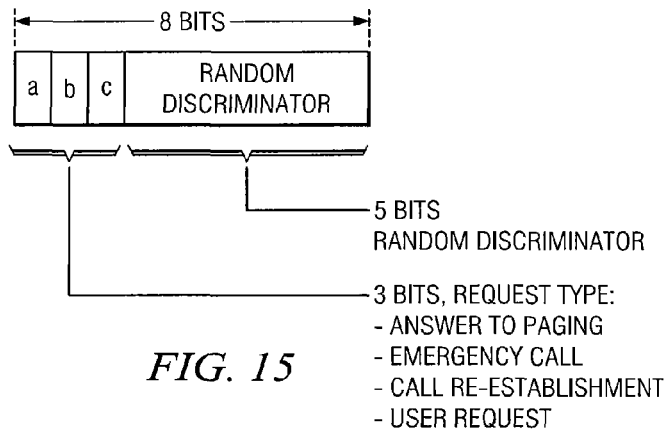
FIG. 15 illustrates an example encoding of RACH data, according to certain embodiments of the present invention.

FIG. 15 illustrates an example encoding of RACH data, according to certain embodiments of the present invention.

Figure 16:
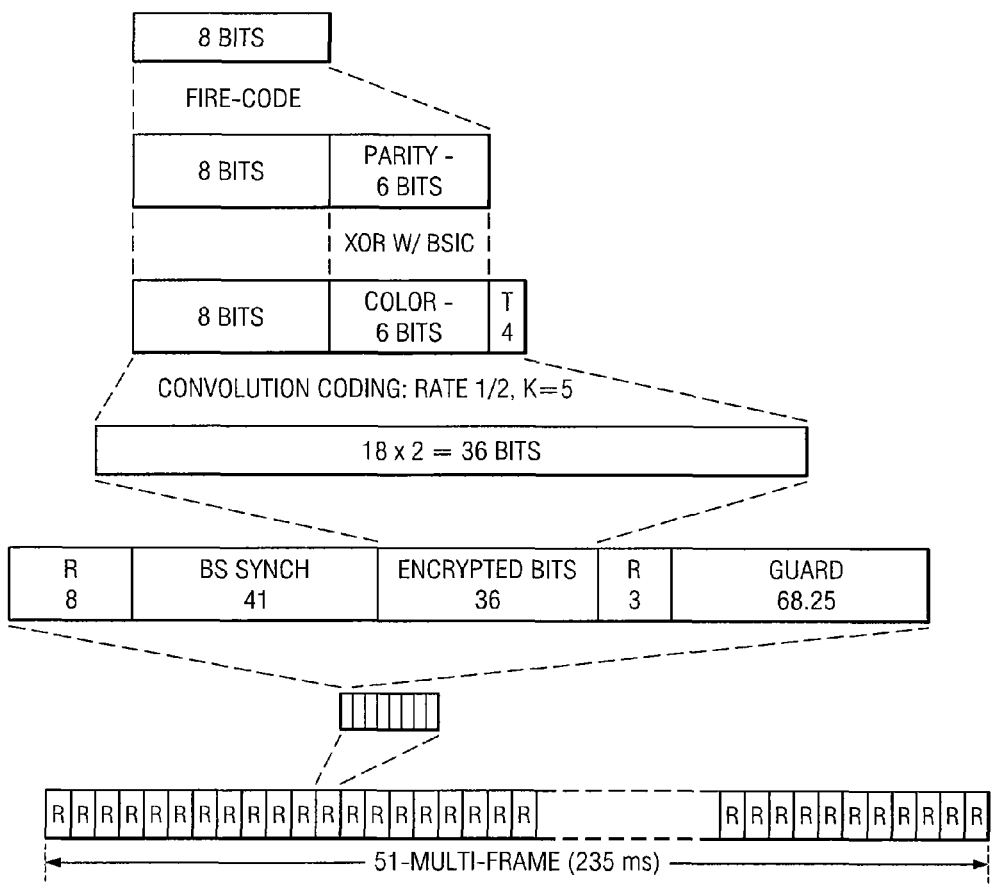
FIG. 16 illustrates an example encoding of RACH bits into TDMA frames, according to certain embodiments of the present invention.

FIG. 16 illustrates an example encoding of RACH bits into TDMA frames, according to certain embodiments of the present invention.

Tag Registration Process

Figure 17:
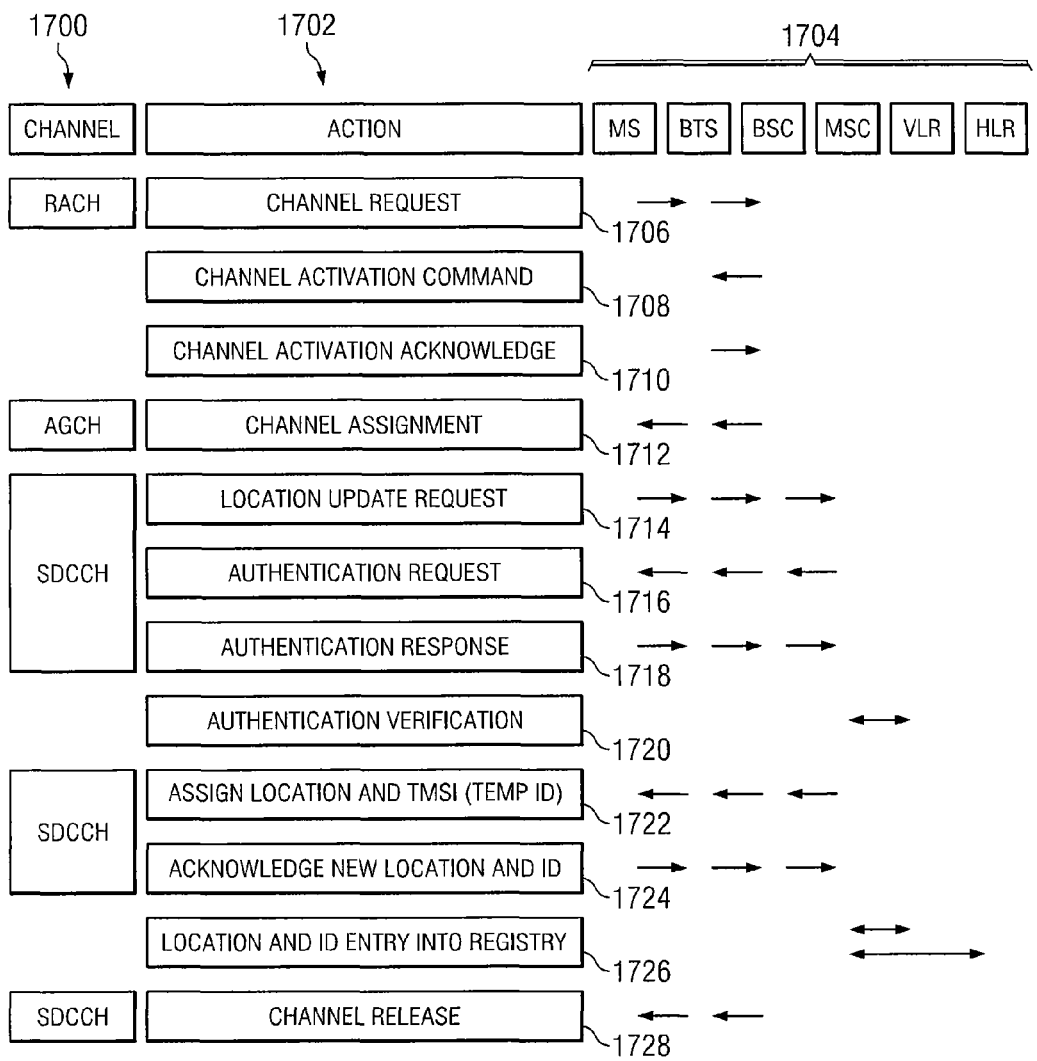
FIG. 17 illustrates an example process for registration of mobile units (e.g., tags), according to certain embodiments of the present invention.

FIG. 17 illustrates an example process for registration of mobile units 710 (e.g., tags 12), according to certain embodiments of the present invention. The illustrated process is provided for example purposes only. Channels 1700 indicate the channel on which a step occurs. Actions 1702 indicate the step in the registration process. Components 1704 indicate the components of GSM network 700 that may be involved in performing actions 1702.

At action 1706, mobile unit 710 (e.g., tag 12) may initiate a channel request. The channel request may be performed using the RACH, and may be transmitted from tag 12 to base station 702 and ultimately to BSC 704. At action 1708, BSC 704 may issue a channel activation command to base station 702 on the RACH. At action 1710, base station 702 may acknowledge to BSC 704 using the RACH that the channel has been activated.

At action 1712, using the access AGCH, BSC 704 may communicate a channel assignment via base station 702 to tag 12. At action 1714, mobile unit 710 (e.g., tag 12) may transmit a location update request to MSC 708 using the standalone dedicated channel (SDCCH). At action 1716, MSC 708 may communicate an authentication request to tag 12 using the SDCCH. At action 1718, mobile unit 710 (e.g., tag 12) may communicate to MSC 708 an authentication response using the SDCCH. At action 1720, MSC 708 and VLR 712 may perform authentication verification.

At action 1722, using the SDCCH, MSC 708 may communicate an assigned location and temporary ID (e.g., TMSI) to tag 12. At action 1724, using the SDCCH, mobile unit 710 (e.g., tag 12) may communicate an acknowledgement of the new location and TMSI to MSC 708. At action 1726, MSC 708, VLR 712, and HLR 714 may cooperate to enter the location and TMSI into a registry. At action 1728, BSC 704 communicates a channel release to tag 12 using the SDCCH.

Data Transmission Process

FIG. 18 illustrates an example process for transmitting data from mobile units 710 (e.g., tags 12), according to certain embodiments of the present invention. The illustrated process is provided for example purposes only. Channels 1800 indicate the channel on which a step occurs. Tag transmits 1802 indicate actions in the data transmission process performed by a tag 12. Network transmits 1804 indicate actions in the data transmission process performed by GSM 700.

At action 1806, mobile unit 710 (e.g., tag 12) transmit a channel request using the RACH. At action 1808, GSM 700 may transmit a channel assignment using the AGCH.

At action 1810, mobile unit 710 (e.g., tag 12) may transmit a connection management service request using the SDCCH. At action 1812, GSM 700 may transmit an authentication request using the SDCCH. At action 1814, mobile unit 710 (e.g., tag 12) may transmit an authentication response using the SDCCH. At action 1816, GSM 700 may transmit and encryption mode command using the SDCCH. At action 1818, mobile unit 710 (e.g., tag 12) may transmit an encryption mode complete signal.

At action 1820, mobile unit 710 (e.g., tag 12) may transmit a call setup signal (using subscriber identification number 304) via the SDCCH. At action 1822, using the SDCCH, GSM 700 may transmit a call proceeding (routing) signal. At action 1824, GSM 700 may transmit a traffic channel assignment using the SDCCH.

At action 1826, mobile unit 710 (e.g., tag 12) may transmit a channel assignment complete signal using the fast access control channel (FACCH) and/or the TCH. At action 1828, GMS 700 may transmit an alerting recipient signal using the FACCH/TCH. At action 1830, GSM 700 may establish a connection using the FACCH/TCH. At action 1832, mobile unit 710 (e.g., tag 12) may transmit a connection acknowledgement using FACCH/TCH. At action 1834, data exchange may be performed using the TCH.

Data Reception Process

Figure 19:
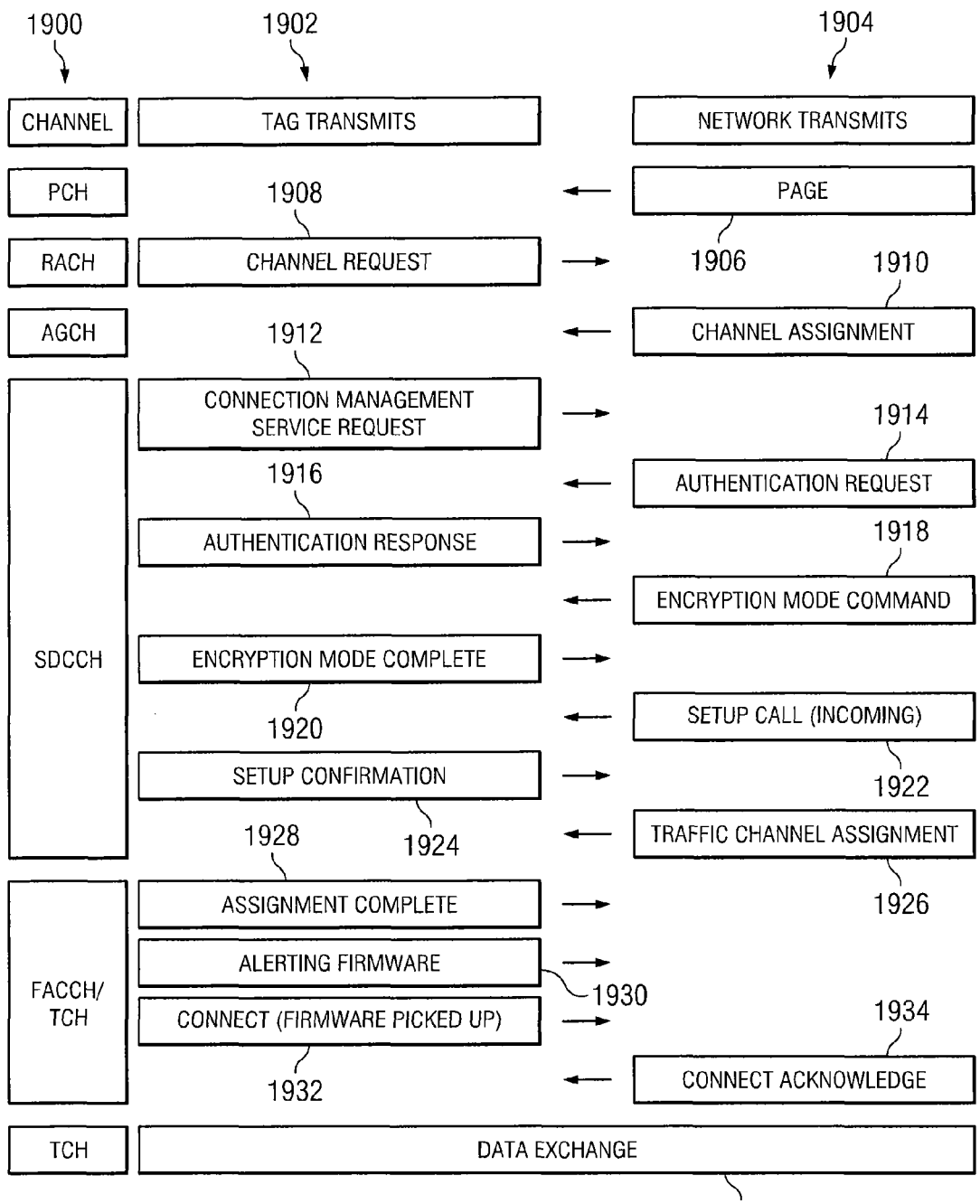
FIG. 19 illustrates an example process for receiving data at mobile units (e.g., tags), according to certain embodiments of the present invention.

FIG. 19 illustrates an example process for receiving data at mobile units 710 (e.g., tags 12), according to certain embodiments of the present invention. The illustrated process is provided for example purposes only. Channels 1900 indicate the channel on which a step occurs. Tag transmits 1902 indicate actions in the data transmission process performed by a tag 12. Network transmits 1904 indicate actions in the data transmission process performed by GSM 700.

At action 1906, GSM 700 transmits a page to tag 12 using the paging channel (PCH). At action 1908, mobile unit 710 (e.g., tag 12) transmits a channel request using the RACH. At action 1910, GSM 700 may transmit a channel assignment using the AGCH.

At action 1912, mobile unit 710 (e.g., tag 12) may transmit a connection management service request using the SDCCH. At action 1914, GSM 700 may transmit an authentication request using the SDCCH. At action 1916, mobile unit 710 (e.g., tag 12) may transmit an authentication response using the SDCCH. At action 1918, GSM 700 may transmit and encryption mode command using the SDCCH. At action 1920, mobile unit 710 (e.g., tag 12) may transmit an encryption mode complete signal.

At action 1922, GSM 700 may transmit a call setup signal (incoming) via the SDCCH. At action 1924, using the SDCCH, mobile unit 710 (e.g., tag 12) may transmit a setup confirmation using the SDCCH. At action 1926, GSM 700 may transmit a traffic channel assignment using the SDCCH.

At action 1928, mobile unit 710 (e.g., tag 12) may transmit a channel assignment complete signal using the FACCH and/or the TCH. At action 1930, mobile unit 710 (e.g., tag 12) may transmit an alerting firmware signal using FACCH/TCH. At action 1932, GSM 700 may establish a connection (firmware picked up) using the FACCH/TCH. At action 1934, mobile unit 710 (e.g., tag 12) may transmit a connection acknowledgement using FACCH/TCH. At action 1936, data exchange may be performed using the TCH.

Frame Formats

FIG. 20 illustrates an example of different TDMA frame formats, according to certain embodiments of the present invention.

Although the present invention has been described with several embodiments, diverse changes, substitutions, variations, alterations, and modifications may be suggested to one skilled in the art, and it is intended that the invention encompass all such changes, substitutions, variations, alterations, and modifications as fall within the spirit and scope of the appended claims.

What is claimed is:

1. A radio frequency identification (RFID) tag, comprising:
a memory module operable to store a common subscriber identification number shared by the tag and one or more other tags for accessing a wireless wide area network (WWAN), each tag operable to access the WWAN using the common subscriber identification number at a corresponding unique timeslot for the tag, the corresponding unique timeslot for the tag being distinct from the timeslots at which the other tags can access the WWAN using the common subscriber identification number; and one or more processing units operable to:
  access the WWAN using the common subscriber identification number to initiate a tag session, the tag session being at the corresponding unique timeslot for the tag, the corresponding unique timeslot for the tag being distinct from timeslots at which the one or more other tags may access the WWAN using the common subscriber identification number to initiate tag sessions; and
  communicate tag information during the tag session at the corresponding unique timeslot for the tag.

2. The RFID tag of claim 1, wherein at the corresponding unique timeslot for the tag, the one or more processing units are operable to access the WWAN using the common subscriber identification number by initiating a wireless call on the WWAN using the common subscriber identification number.

3. The RFID tag of claim 1, wherein:
  the memory module is operable to store timeslot information identifying the corresponding timeslot for the tag, the corresponding timeslot having a predetermined start time and duration pre-assigned to the tag for the tag to conduct the tag session; and
  the one or more processing units are operable to communicate the tag information during the pre-assigned timeslot.

4. The RFID tag of claim 3, wherein the one or more processing units are operable to:
  wake up the tag from a sleep state a predetermined amount of time prior to predetermined start time of the corresponding timeslot for the tag; and
  after waking up the tag and prior to accessing the WWAN using the common subscriber identification number, locate a base station and perform clock synchronization.

5. The RFID tag claim 3, wherein the corresponding unique timeslot for the tag is one of a plurality of timeslots within a fixed time period, each of the tag and the one or more other tags having a corresponding assigned timeslot within the fixed time period.

6. The RFID tag of claim 1, wherein the one or more processing units are operable to:
  receive an access token authorizing the tag to access the WWAN using the common subscriber identification number while the tag is in possession of the access token;
  access the WWAN using the common subscriber identification number to initiate the tag session while the tag is in possession of the access token;
  communicate tag information during the tag session; and
  transmit, after termination of the tag session, the access token to another tag.

7. The RFID tag claim 6, wherein the access token is operable to expire after a predetermined time period such that the tag may no longer access the WWAN using the common subscriber identification number after the predetermined time period has expired.

8. The RFID tag of claim 6, wherein the duration of the tag session for the tag is different from the duration of a tag session for another tag.

9. The RFID tag of claim 1, wherein the one or more processing units are operable to:
  determine whether each of the tag and the one or more other tags can communicate directly with one another;
  if it is determined the tag and the one or more other tags can communicate directly with one another, initiate tag sessions according to a variable-length session technique; and
  if it is determined that the tag and the one or more other tags are not able to communicate directly with each other, initiate tag sessions according to a fixed-length session technique.

10. The RFID tag of claim 1, wherein the common subscriber identification number comprises a cellular telephone number.

11. The RFID tag of claim 1, wherein the tag information communicated during the tag session for the tag comprises one or more fixed-length data packets.

12. A method, comprising:
  storing a common subscriber identification number shared by a particular tag and one or more other tags for accessing a wireless wide area network (WWAN), each tag operable to access the WWAN using the common subscriber identification number at a corresponding unique timeslot for the tag, the corresponding unique timeslot for the particular tag being distinct from the timeslots at which the other tags can access the WWAN using the common subscriber identification number;
  accessing the WWAN using the common subscriber identification number to initiate a tag session, the tag session being at the corresponding unique timeslot for the particular tag, the corresponding unique timeslot for the particular tag being distinct from timeslots at which the one or more other tags may access the WWAN using the common subscriber identification number to initiate tag sessions; and
  communicating tag information during the tag session at the corresponding unique timeslot for the particular tag.

13. The method of claim 12, comprising accessing, at the corresponding unique timeslot for the particular tag, the WWAN using the common subscriber identification number by initiating a wireless call on the WWAN using the common subscriber identification number.

14. The method of claim 12, comprising:
  storing timeslot information identifying the corresponding timeslot for the particular tag, the corresponding timeslot having a predetermined start time and duration pre-assigned to the particular tag for the particular tag to conduct the tag session; and
  communicating the tag information during the pre-assigned timeslot.

15. The method of claim 14, comprising:
  waking up from a sleep state a predetermined amount of time prior to predetermined start time of the corresponding timeslot for the particular tag; and
  after waking up and prior to accessing the WWAN using the common subscriber identification number, locating a base station and perform clock synchronization.

16. The method of claim 14, wherein the corresponding unique timeslot for the particular tag is one of a plurality of timeslots within a fixed time period, each of the particular tag and the one or more other tags having a corresponding assigned timeslot within the fixed time period.

17. The method of claim 12, comprising:
  receiving an access token authorizing the particular tag to access the WWAN using the common subscriber identification number while the particular tag is in possession of the access token;
  accessing the WWAN using the common subscriber identification number to initiate the tag session while the particular tag is in possession of the access token;
  communicating tag information during the tag session; and
  transmitting, after termination of the tag session, the access token to another tag.

18. The method of claim 17, wherein the access token is operable to expire after a predetermined time period such that the particular tag may no longer access the WWAN using the common subscriber identification number after the predetermined time period has expired.

19. The method of claim 17, wherein the duration of the tag session for the particular tag is different from the duration of a tag session for another tag.

20. The method of claim 12, comprising:
determining whether each of the particular tag and the one or more other tags can communicate directly with one another;
if it is determined the particular tag and the one or more other tags can communicate directly with one another, initiating tag sessions according to a variable-length session technique; and
if it is determined that the particular tag and the one or more other tags are not able to communicate directly with each other, initiating tag sessions according to a fixed-length session technique.

21. The method of claim 12, wherein the common subscriber identification number comprises a cellular telephone number.

22. The method of claim 12, wherein the tag information communicated during the tag session for the particular tag comprises one or more fixed-length data packets.

23. Software embodied in a tangible computer-readable hardware medium, the software when executed by a processor operable to perform operations comprising:
storing, in a memory module, a common subscriber identification number shared by a particular tag and one or more other tags for accessing a wireless wide area network (WWAN), each tag operable to access the WWAN using the common subscriber identification number at a corresponding unique timeslot for the tag, the corresponding unique timeslot for the particular tag being distinct from the timeslots at which the other tags can access the WWAN using the common subscriber identification number;
accessing, via the processor, the WWAN using the common subscriber identification number to initiate a tag session, the tag session being at the corresponding unique timeslot for the particular tag, the corresponding unique timeslot for the particular tag being distinct from timeslots at which the one or more other tags may access the WWAN using the common subscriber identification number to initiate tag sessions; and
communicating, via the processor, tag information during the tag session at the corresponding unique timeslot for the particular tag.

24. The software of claim 23, wherein the operations comprise to accessing, at the corresponding unique timeslot for the particular tag, the WWAN using the common subscriber identification number by initiating a wireless call on the WWAN using the common subscriber identification number.

25. The software of claim 23, wherein the operations comprise:
storing, in a memory module, timeslot information identifying the corresponding timeslot for the particular tag, the corresponding timeslot having a predetermined start time and duration pre-assigned to the particular tag for the particular tag to conduct the tag session; and
communicating, via the processor, the tag information during the pre-assigned timeslot.

26. The software of claim 25, wherein the operations comprise:
waking up from a sleep state a predetermined amount of time prior to predetermined start time of the corresponding timeslot for the particular tag; and
after waking up and prior to accessing the WWAN using the common subscriber identification number, locating a base station and perform clock synchronization.

27. The software of claim 25, wherein the corresponding unique timeslot for the particular tag is one of a plurality of timeslots within a fixed time period, each of the particular tag and the one or more other tags having a corresponding assigned timeslot within the fixed time period.

28. The software of claim 23, wherein the operations comprise:
receiving, via the processor, an access token authorizing the particular tag to access the WWAN using the common subscriber identification number while the particular tag is in possession of the access token;
accessing, via the processor, the WWAN using the common subscriber identification number to initiate the tag session while the particular tag is in possession of the access token;
communicating, via the processor, tag information during the tag session; and
transmitting, via the processor, after termination of the tag session, the access token to another tag.

29. The software of claim 28, wherein the access token is operable to expire after a predetermined time period such that the particular tag may no longer access the WWAN using the common subscriber identification number after the predetermined time period has expired.

30. The software of claim 28, wherein the duration of the tag session for the particular tag is different from the duration of a tag session for another tag.

31. The software of claim 23, wherein the operations comprise:
determining, via the processor, whether each of the particular tag and the one or more other tags can communicate directly with one another;
if it is determined the particular tag and the one or more other tags can communicate directly with one another, initiating, via the processor, tag sessions according to a variable-length session technique; and
if it is determined that the particular tag and the one or more other tags are not able to communicate directly with each other, initiating, via the processor, tag sessions according to a fixed-length session technique.

32. The software of claim 23, wherein the common subscriber identification number comprises a cellular telephone number.

33. The software of claim 23, wherein the tag information communicated during the tag session for the particular tag comprises one or more fixed-length data packets.

* * * * *